Sept. 25, 1956

L. P. BLACK 2,764,039

AUTOMATIC CONTROL FOR MACHINES

Filed Jan. 29, 1953

INVENTOR.
Leon Paul Black
BY Thomas J. Byrne,
attorney

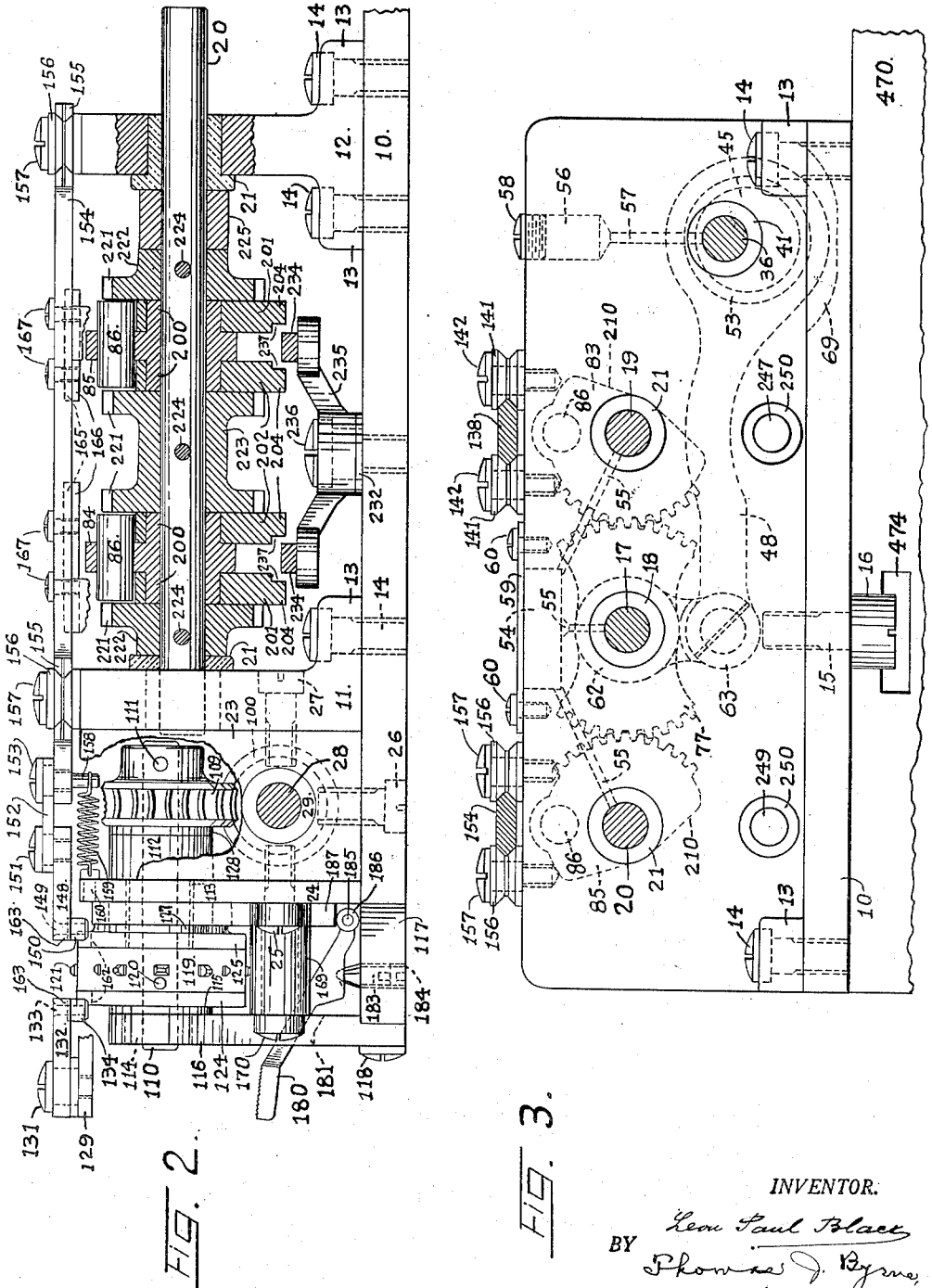

INVENTOR.
Leon Paul Black
BY Thomas J. Byrne
Attorney

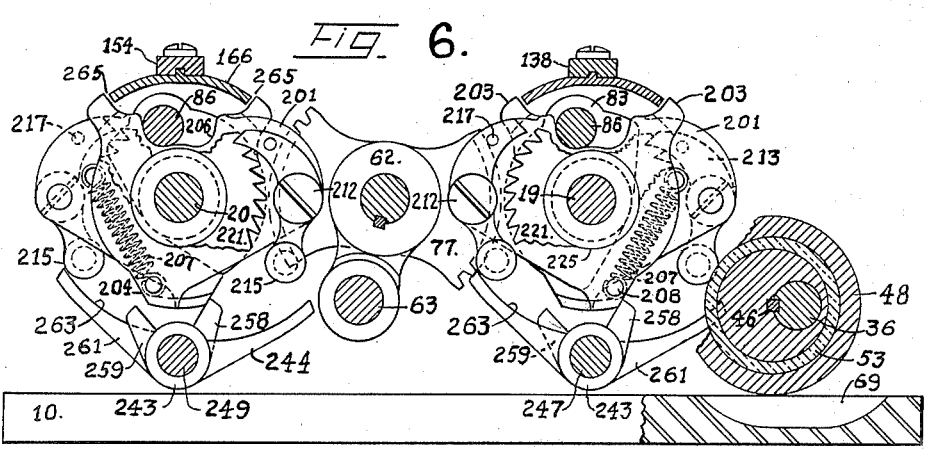

Sept. 25, 1956   L. P. BLACK   2,764,039
AUTOMATIC CONTROL FOR MACHINES
Filed Jan. 29, 1953   11 Sheets-Sheet 5

INVENTOR.
Leon Paul Black
BY Thomas J. Byrne
Attorney

Sept. 25, 1956 L. P. BLACK 2,764,039
AUTOMATIC CONTROL FOR MACHINES
Filed Jan. 29, 1953 11 Sheets-Sheet 6

INVENTOR.
Leon Paul Black
BY Thomas J. Byrne
attorney

Sept. 25, 1956  L. P. BLACK  2,764,039
AUTOMATIC CONTROL FOR MACHINES
Filed Jan. 29, 1953  11 Sheets-Sheet 7

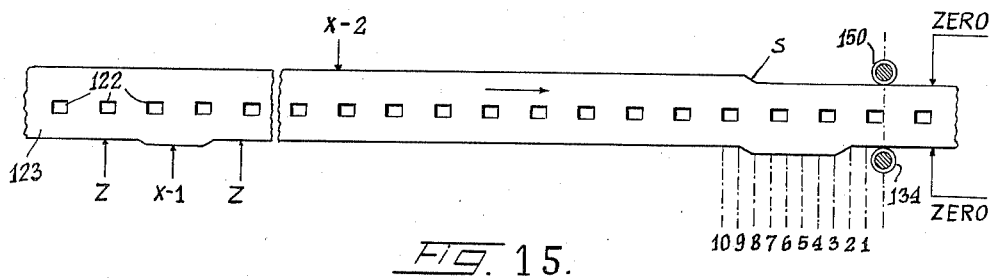

FIG. 15.

X-2 – CAUSES SHAFT 20 TO ROTATE CLOCKWISE TWO FEED-UNITS PER CYCLE OF SHAFT 28
X-1 –    "      "    "    "     "       "       ONE   "     "      "     "    "    "
Z –     "      "    "    "  BE STATIONARY
Y-1 –    "      "    "    "  ROTATE COUNTER-CLOCKWISE ONE FEED UNIT PER CYCLE
Y-2 –    "      "    "    "    "        "         "    TWO  "    "   "    "

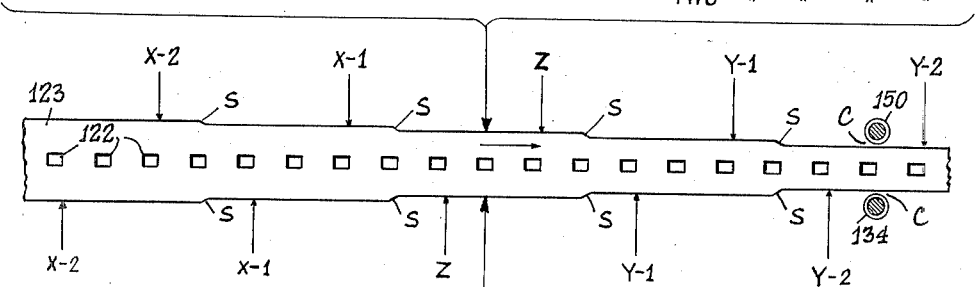

X-2 – CAUSES SHAFT 19 TO ROTATE CLOCKWISE TWO FEED-UNITS PER CYCLE OF SHAFT 28
X-1 –    "      "    "    "     "       "       ONE   "     "      "     "    "    "
Z –     "      "    "    "  BE STATIONARY
Y-1 –    "      "    "    "  ROTATE COUNTER-CLOCKWISE ONE FEED UNIT PER CYCLE
Y-2 –    "      "    "    "    "        "         "    TWO  "    "   "    "

FIG. 16.

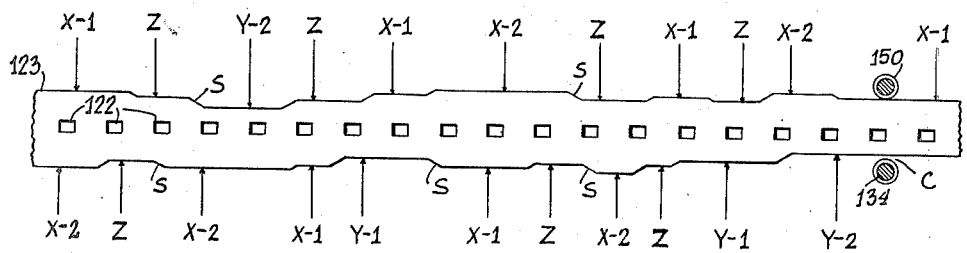

FIG. 17.

INVENTOR.
Leon Paul Black
BY Thomas J. Byrne,
Attorney

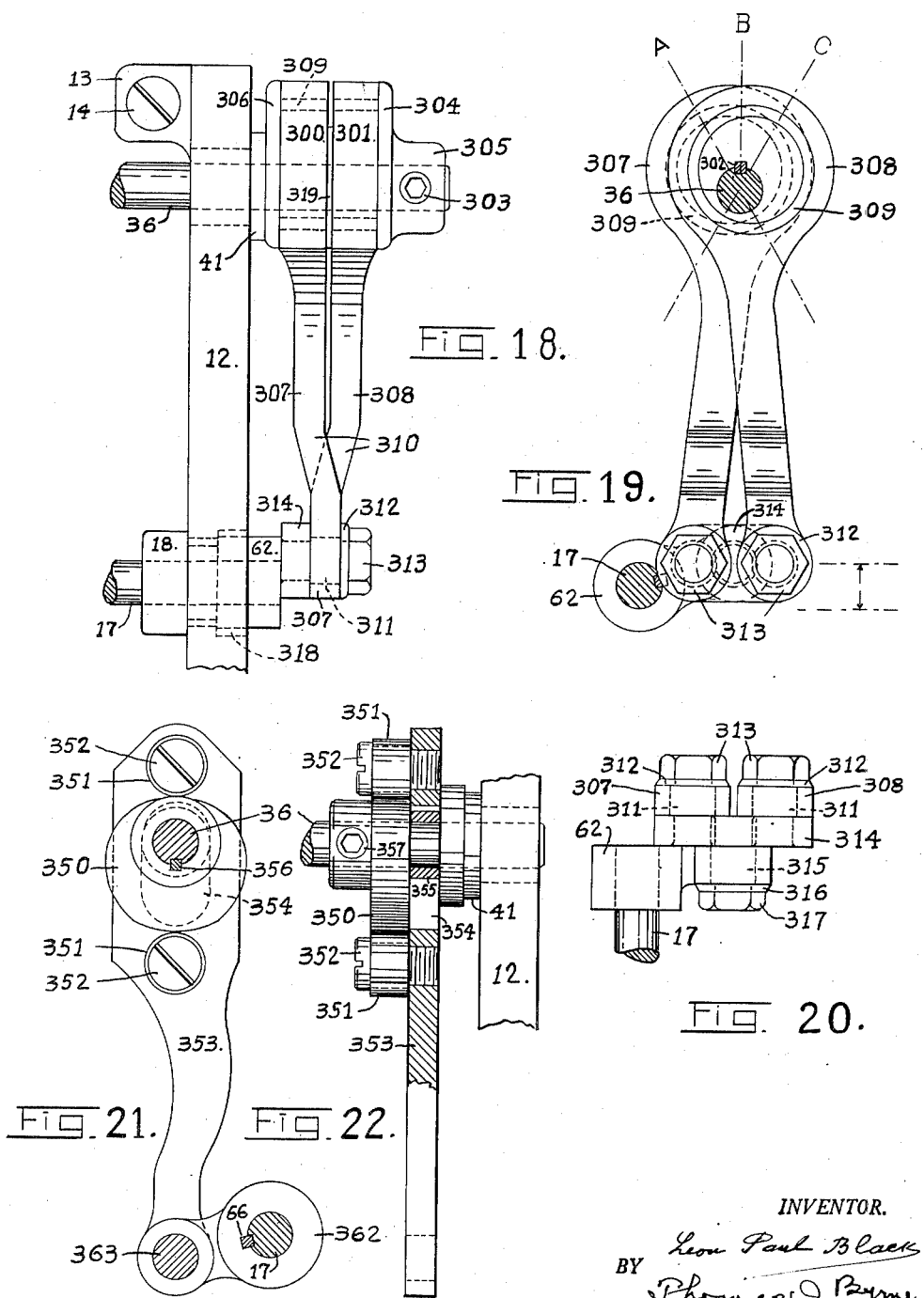

Sept. 25, 1956 L. P. BLACK 2,764,039
AUTOMATIC CONTROL FOR MACHINES
Filed Jan. 29, 1953 11 Sheets-Sheet 9

INVENTOR.
Leon Paul Black
BY Thomas J. Byrne,
Attorney

Sept. 25, 1956  L. P. BLACK  2,764,039
AUTOMATIC CONTROL FOR MACHINES
Filed Jan. 29, 1953  11 Sheets-Sheet 10

INVENTOR.
Leon Paul Black
BY Thomas J. Byrne,
attorney

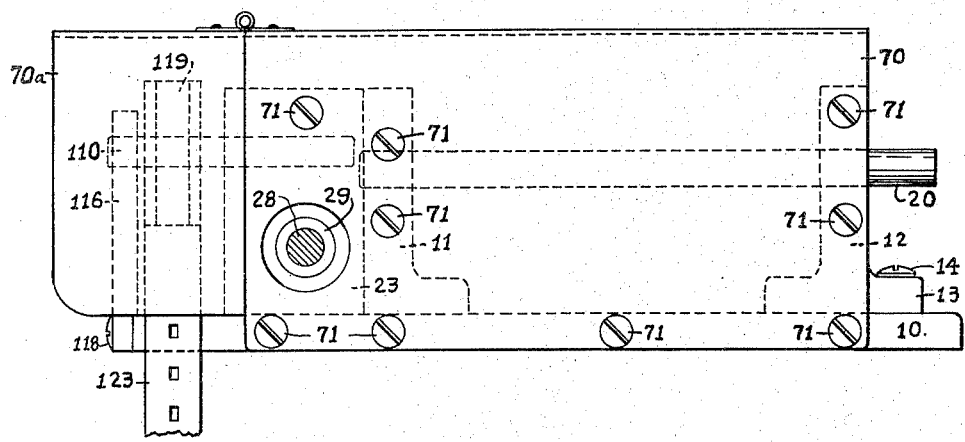
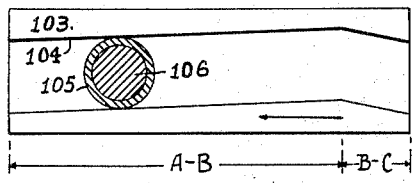
Fig. 33.
Fig. 29.
Fig. 31.
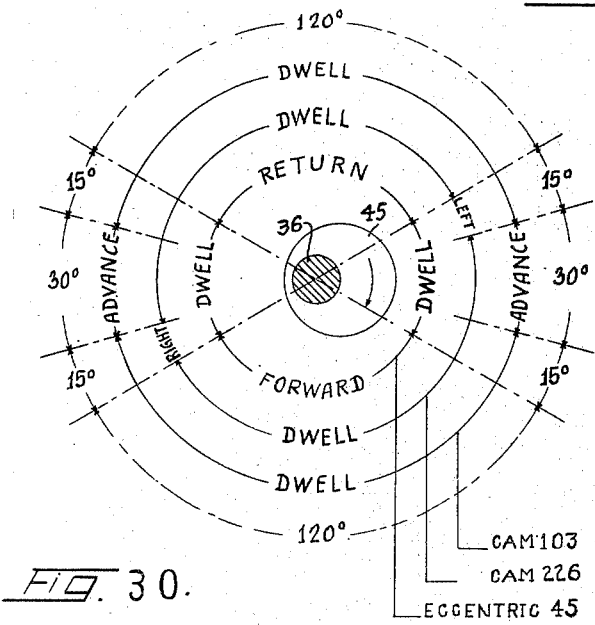
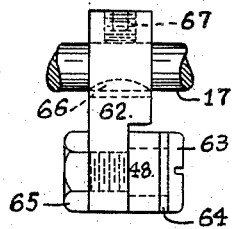
Fig. 32.
Fig. 30.
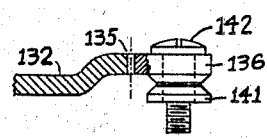

United States Patent Office 2,764,039
Patented Sept. 25, 1956

2,764,039

AUTOMATIC CONTROL FOR MACHINES

Leon Paul Black, Cliffside Park, N. J.

Application January 29, 1953, Serial No. 333,974

45 Claims. (Cl. 74—665)

The present invention relates to automatic control devices for control of movements of machines and devices of many types for automatic production of a great variety of products.

The present device, due to its positive and precise performance and its considerable power, is suitable for controlling or controlling and operating a variety of machines in different fields, such as machine tools: milling machines, engraving machines, lathes, etc., textile machinery for production of intricate pattern designs in silk, carpets, etc., Shiffli-type of embroidery machines, including those currently controlled by the old Jacquard system, and in many other fields.

Application of the present device to a conventional vertical milling machine for production, in multiple, of a complex aircraft component by a three-dimensional operation, is illustrated in the drawings and described in detail in the specification. Its application to a lathe is also described. From these examples, many other applications will become apparent.

The automatic feature of this device not only insures accuracy and uniformity in the product of the machine to which this device is applied, but its efficiency will substantially be increased because the machine may be run continuously at its maximum production speed, without unnecessary stoppages occurring when manually operated, for such reasons as manipulating various handles and levers, reading dials and consulting blueprints.

In my co-pending application for patent, Serial No. 45,728, filed August 23, 1948, now Patent No. 2,642,659, issued June 23, 1953, there is disclosed a record tape having undulations in its edges, which are effective in cam-fashion on mechanism associated therewith for both control and operation of a fountain pen in all directions, for reproduction of designs of many kind and for applying signatures. The record disclosed in that application is satisfactory for the comparatively light work involving that of guiding pen over paper. In the present application, the work performed by the control device requiring considerable power, the function of the record being exclusively for control, but its operation is performed by an electric motor of the required capacity, in consonance with the record. The latter, therefore, is devoid of operating undulations in its edges and is provided with parallel controlling portions instead, working on entirely different principle, as described below.

The illustrative embodiment of the invention may conveniently be divided into four main parts; namely, (1) the record and means for driving it by the power shaft; (2) the record-controlled movement-transfer mechanism; (3) the dual motion-translating mechanism, and (4) the torque-amplifying mechanism actuated by the same power shaft driven by a source of power, such as an electric motor of the required capacity.

Briefly, the function of each of said parts is as follows: (1) the record, being structurally in the form of a tape, is provided with three, four, five or more parallel control steps of constantly varying length in each of its two edges, constituting the registry of movements permanently recorded therein, for subsequent reproduction in greatly increased strength by the other parts of the device, and any one of which steps at a time may alternatively be brought into operative position for engagement with elements associated therewith. There are three main controlling factors in the record, and these are: (A) the relative predetermined position, in terms of distance, of the several steps available at each side of the record as among themselves and in respect to the longitudinal axis located at the center of its perforations; (B) the varying length of the step-like portions on both edges of the record, which determines the aggregation of feed-units in one direction of the respective output, shafts, and (C) the position of steps on one side or the other in respect to the Zero predetermined position at each side of the record, which determines the direction of rotation of the respective output shafts.

The adjacent steps being connected by inclines or slopes, but the latter's effect as a controlling instrumentality is confined to facilitate the operative engagement of the record edges with the rollers of the associated with the record mechanism, termed record-controlled movement-transfer mechanism, by the action of light springs during which operative engagement the direction of rotation and the speed of output shafts, independently of the speed at the time of the power shaft, are determined. Other controlling factors of the record are pointed out in the specification.

The record tape is essentially a movement-controlling element, effective for setting other elements in varying predetermining positions, so that still other elements integrated with the latter, and motor-driven, may amplify to a great extent the minute movements generated by the record, for transmission to output shafts for control of the machine to which the control device is applied, in strict accordance with the registry of movements on the record. At each side of the record, one controlling step is termed Zero, because its influence being zero so far as generating movements is concerned. In the specification and drawings the Zero step is illustrated as centrally located among five steps at each side of the record, but this is not imperative, as the Zero step may be so located, for instance, as to have two steps on one side and one on the other, and in that case the cooperating mechanism will need some minor alterations. The provision of two alternative steps at each side of the Zero step, as illustrated in the drawings, is to afford either one or two feed-units per operative cycle, in order that the range of control may thereby be increased as compared to a record tape having only three alternative steps, including a Zero step at each edge. The Zero step has still other functional features which will become evident from the description, among which is the safety factor making it impossible for the mechanism to position itself for simultaneous rotation in both directions, because its elements must pass through the Zero step, which neutralize them, when changing direction of movement. Although the movement generated at one edge of the record affecting the rotation of one output shaft is independent from that of the other edge affecting the rotation of the second output shaft, synchronism of movements of both output shafts is assured by the arrangement of the mechanism.

(2) The record-controlled movement transferring mechanism is a dual spring pressed mechanism in engagement with both sides of the record and effective for transferring minute movements of the record, when in engagement with the slopes of the latter, to motion-translating units for further action. This transfer mechanism being of relatively sturdy construction to withstand constant contacts with the motion-translating mechanisms relieves the record from undue strain, and is convenient in the general arrangement of the mechanisms. However, when the transfer mechanism is in engagement with the record at other points than the slopes, the steps being parallel to the longitudinal axis of the record, there will be no movement transmittal to the transfer mechanism by the latter, which is as it should be, in order that the effectiveness of steps for generating movements remain intact. In other words, when one step succeeds another, a corresponding movement by the connecting slope is imparted to the transfer mechanism which transfers the occurring change in the record to the motion-translating units for correlative change in position of some of its elements, and when steps of any length are in operative position with the transfer mechanism, the latter will remain immovable and therefore the position of the elements forming part of the motion-translating mechanisms assumed by the preceding movement of the transfer mechanism, will remain in force until changed again when one step ends and another begins. One half of the dual transfer mechanism cooperating with one side of the record may dwell while the other half cooperating with the other side may shift, depending of steps on the record. During such dwell positions of the transfer mechanism, rotation in one direction for a multiple of feed-units of the respective output shafts occurs.

(3) The dual motion-translating mechanisms mounted on two output shafts independent of each other are effective in arranging certain of their constituted elements in accordance with the movements transmitted thereto by the movement-transfer mechanism, in order that these movements be properly distributed between the output shafts, direction of their rotation regulated and in terms of one or two feed-units per operative cycle, for the immediately following engagement by elements connected to the motor-driven power shaft.

(4) The torque-amplifying mechanisms connected directly to the power shaft are adapted for continuous oscillation and for intermittent engagement with the elements of the motion-translating mechanisms with which they are integrated, for driving the output shafts precisely in accordance with the record-controlled movements but with much greater torque, depending on the power of the motor rotating the power shaft.

In addition to the movements controlled and operated by the mechanisms of the control device, independent means such as a solenoid or an electric motor, or both, may be brought in during the operation for performing certain special tasks or functions at regular or irregular intervals, under constant control of the control device, which immensely increase the latter's range of control. One such independent supplemental mechanism, under control of the control device, is illustrated in the drawings and described in the specification.

An important object of the present invention is to provide an automatic control device which shall be suitable for a variety of machines and devices for control only or for both control and operation, without modifications other than that of size and power capacity, as required for best results in each case.

Another important object of the present invention is to provide a control device having its control element in the form of a relatively thin and narrow tape, which can be readily wound in a reel for convenience in use, for long period of control per reel, which could be easily substituted when changes in the control are required, and which shall be relatively inexpensive to produce.

A further important object of the present invention is to provide a control device with a record tape having movements permanently recorded in its edges, in a plurality of parallel step-like controlling portions in its two edges, connected by slopes, each step capable to be brought into operating position for engagement with the associated therewith mechanism.

Still another important object of the present invention is to provide a control device with a record tape having movements recorded in its edges, a mechanism associated therewith including two output shafts, and a torque-amplifying mechanism driven by a source of power, whereby the output shafts may rotate in either direction an amount variable in accordance with the minute movements generated by the record, but driven by the torque-amplifying mechanism at a greatly increased ratio of strength, without any other variations or distortions.

Still a further object is to provide a record tape into which the simplest kind of registry of movements may be introduced for subsequent reproduction by the device in greatly magnified proportion, so that the record may be produced by special devices rapidly, accurately and at low cost, from data obtained from blueprints in case of control for machine tools, or from a pattern design when for use for the control of textile looms.

An additonal object is to so arrange the record element and its associated mechanisms whereby movements in terms of predetermined one feed-unit and two feed-units per cycle in either direction or dwell of output shafts independent each other, driven by the power shaft in accordance with the record, and factors consisting in aggregation of feed-units in one direction between dwells of various extent and supplemental factor or factors brought in during the operation at various regular or irregular periods—enable the control device, by permutation of movements thus produced and amplified, to increase their possible control of movement combinations to a practically unlimited extent.

Still a further object is to provide an automatic control device capable of controlling intricate movements of, for example, a milling machine or an engraving machine, for production of articles by a three-dimensional method of operation, at slow or high speed as required in each case on a flat or cylindrical surface.

A still additional object is to provide a record tape having inherent therein two speed-controls, so that at an instant the speed of the control device may either be doubled or halved then back again at the former speed as and when required, without any shifting of gears or clutches.

These objects of the present invention as well as others, together with its many advantages, will more fully appear in the drawings and in the specification (forming a part thereof). Various changes and substitutions may be made in the illustrative device without departing from the spirit of the invention.

In the drawings:

Fig. 2 is a side elevation, taken along the line 2—2 in Fig. 1, as viewed from the right side of the device, and showing one output shaft carying the combined motion-translating and torque-amplifying mechanism in cross-section, and also the geared connection between the power shaft and the record tape driving mechanism.

Fig. 3 is a rear elevation of the device, taken along the line 3—3 in Fig. 1, with parts in section and illustrating in dotted lines the eccentric, its follower, the pitman and gear sectors of the torque-amplifying mechanism, mounted an two output shafts for simultaneous operation.

Figure 1:
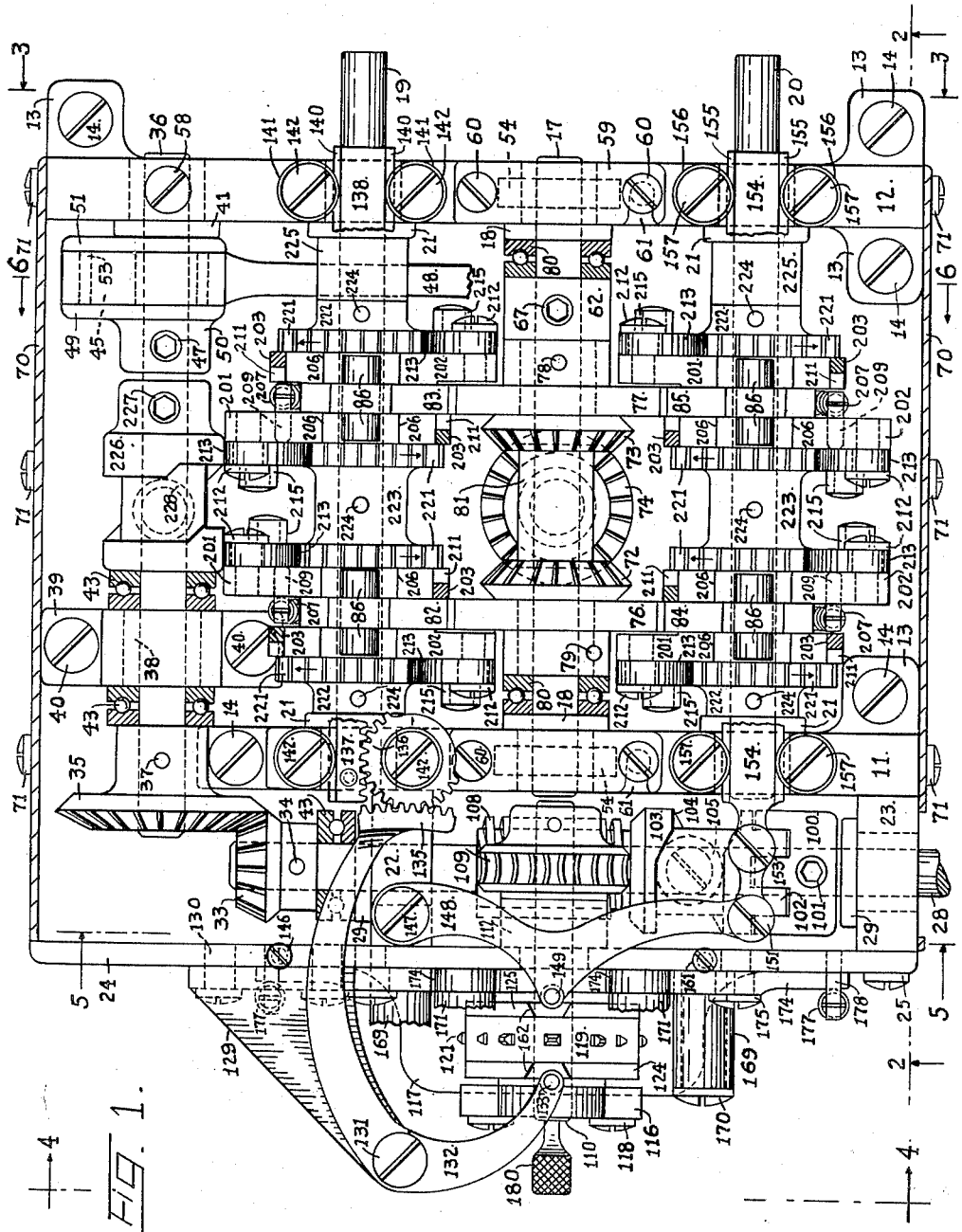
Fig. 1 is a top plan view of an integrated automatic control and torque-amplifying device embodying the present invention, parts of the mechanism being shown in section, others broken away, and certain elements being omitted for the sake of clearness.

Fig. 6 is a vertical sectional view on the line 6—6 of Fig. 1, some parts being shown in section and illustrating ratchet wheels having teeth in opposite direction to their companions and pawl carrying members, some pawls of which being in operative and others in inoperative position relative to their respective ratchet wheels and forming part of two combined motion-translating and torque-amplifying units mounted on two output shafts independent one from the other, said operative and inoperative positions being determined by the position of the eccentric, shown at right, and the auxiliary mechanism shown in engament with some of the pawls.

Fig. 7 is a similar view to that of Fig. 6, but illustrating the change of position of the operating cross-pins of the torque-amplifying mechanism, of the pawls relative to their associated ratchet wheels and of the auxiliary mechanism relative to the pawls and pawl carrying members, occurring upon rotation of the eccentric of through 180°.

Figs. 8, 9 and 10 are detail views, the Figs. 8 and 9 being in elevation and the Fig. 10 being a side view of Fig. 9 of the left and right hand respectively of the pawl carrying members, to illustrate their shape more distinctly.

Figures 11, 12:
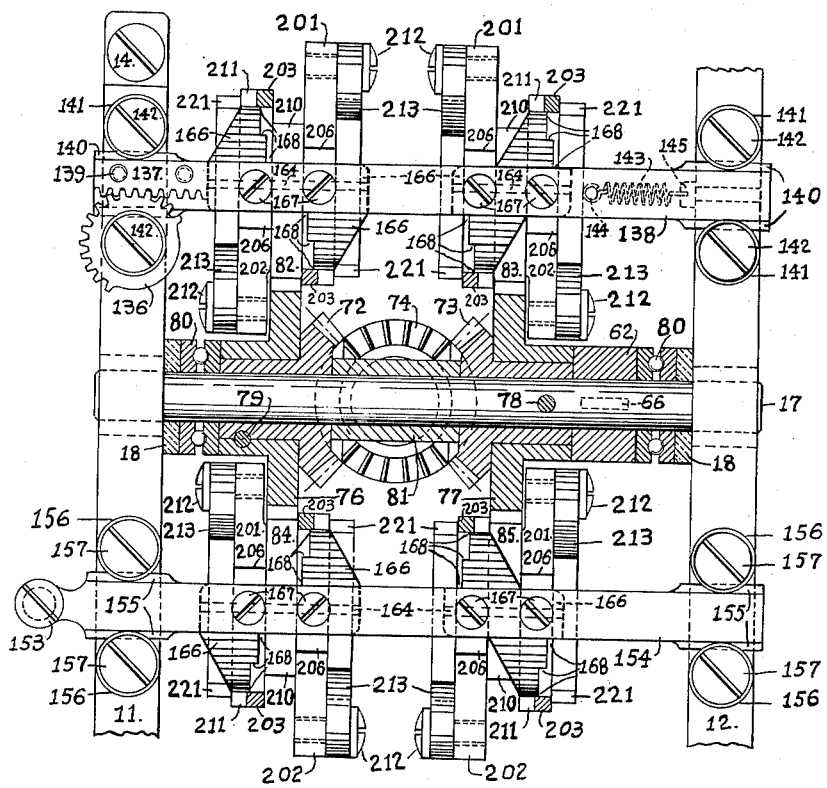

Fig. 11 is a similar view to those of Figs. 6 and 7, but illustrating the change of position of the pawl carrying members occurring in a typical case by the controlling influence of the record tape, whereby one feed-unit and a double feed-unit, respectively from left to right, is about to be transmitted by the power shaft to respective output shafts.

Fig. 12 is a plan view of two sets of stop members, directly controlled by the record tape, serving as stops in various positions for pawl carrying members of the motion-translating units, integrated with torque-amplifying mechanisms for transmission of movement of varying extent, in either direction and of increased torque to two output shafts in accordance with the movements previously recorded in the record tape.

Figure 13:
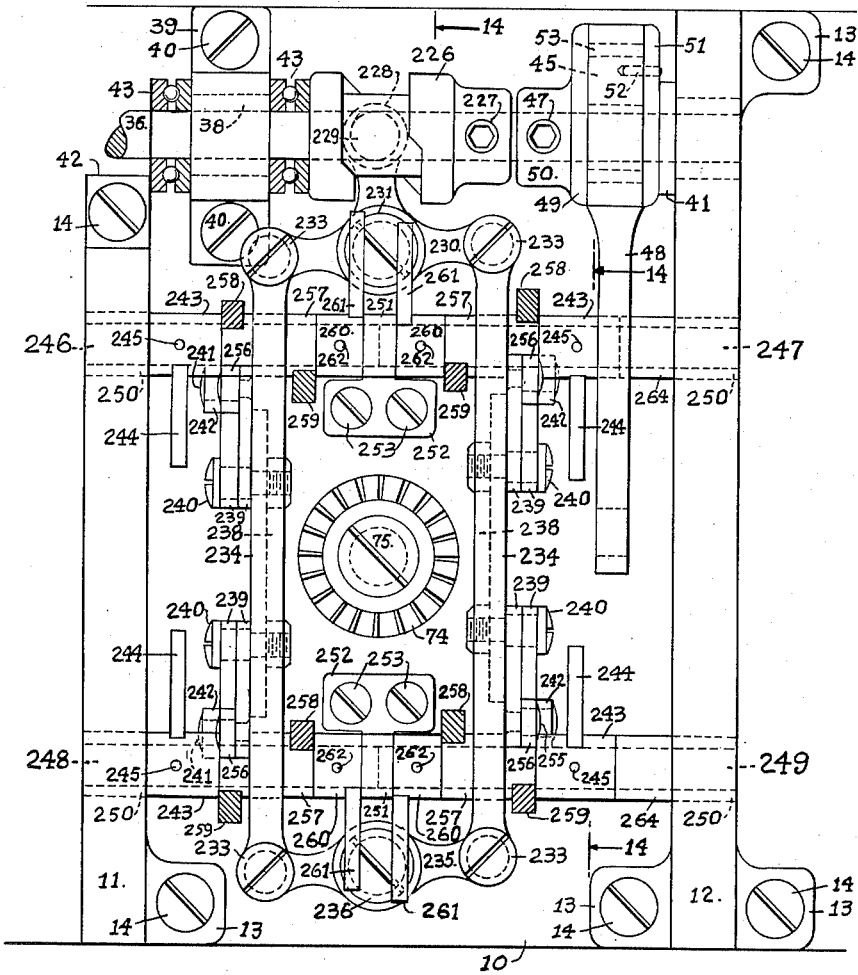

Fig. 13 is a plan view of the device showing an auxiliary mechanism cooperating with the pawls and also with the pawl carrying members, in timed relation with the eccentric actuating said members, through the medium of a cam secured on the same shaft as the eccentric.

Figure 14:
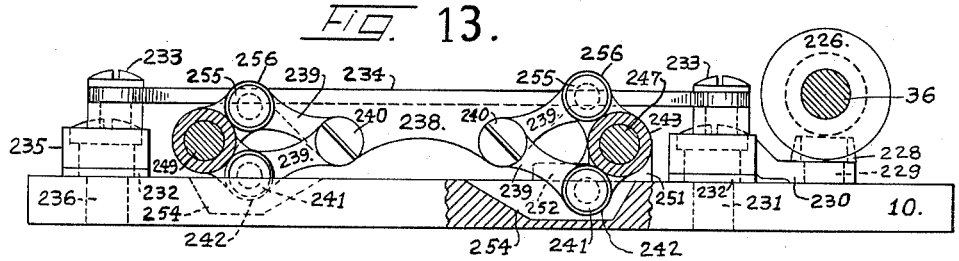

Fig. 14 is a side view in elevation along the line 14—14 in Fig. 13, illustrating the arrangement of connecting links whereby some operating parts are adapted to swing in a direction opposite to similar parts of the mechanism.

Figs. 15, 16 and 17 are plan views of the record tape with annotations thereon indicating its controlling functions.

Figs. 18 and 19 are respectively plan and side views of twin eccentrics an dtwin followers, having extended dwell periods, as alternative for the single eccentric and its follower shown in Figs. 1, 3, 6, 7, 11 and 13.

Fig. 20 is an end view of Fig. 19 showing pivotal connection of both followers with the pitman of the central shaft.

Figs. 21 and 22 are respectively a plan view and a side view of a cam and its follower, as another modification of the single and twin eccentrics shown in Figs. 1, 18 and 19.

Figure 23:
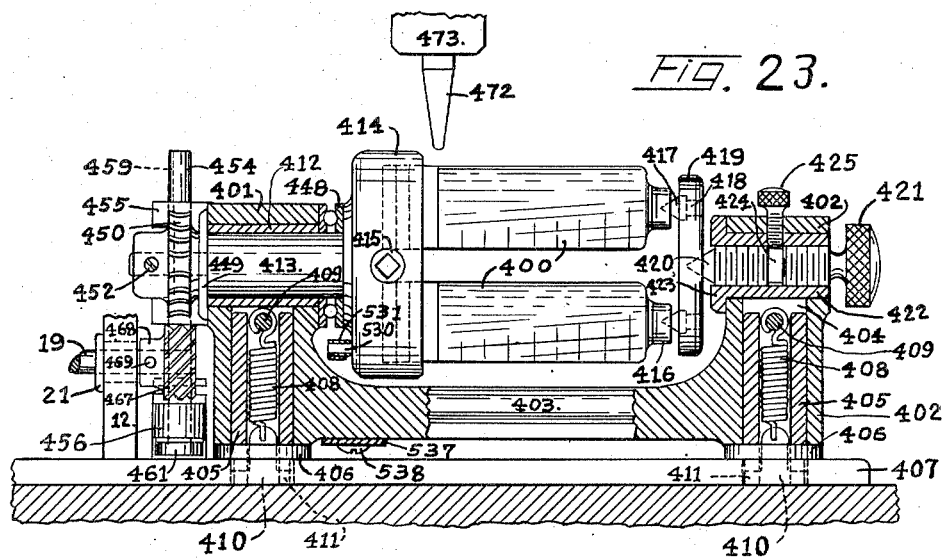
Figures 24, 25:
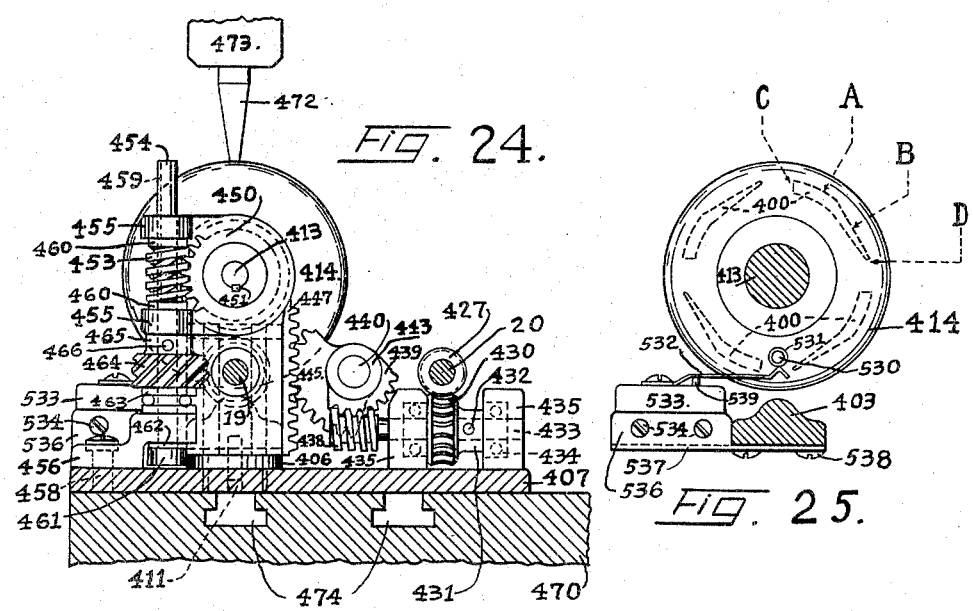

Figs. 23 and 24 are respectively a side and an end view in elevation of a fixture supporting a sample work to be machined, to illustrate how a complicated job may be machined in multiple, by a 3-dimensional method, on a conventional milling machine.

Fig. 25 is a view in elevation of the work holding chuck of the fixture, illustrating in dotted lines the profile of the sample work being machined at a certain point of its length, as an aid in the description of the control device of this invention, and also shown is a microswitch operated by a pin fixed to said chuck.

Figure 26:
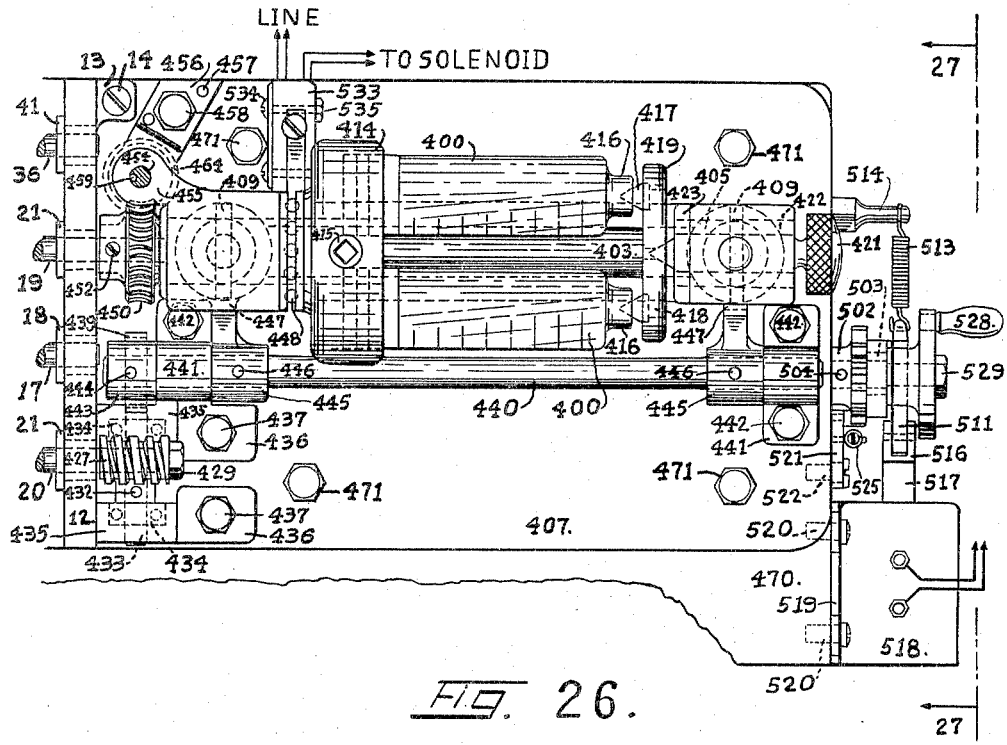

Fig. 26 is a plan view of the fixture shown in Figs. 23 and 24, showing geared connections to the two output shafts projecting from the control device, one of which controls the vertical variable movement of both the chuck and tail stock of the fixture supporting the work being machined by a three-dimensional method of operation, and the other shaft of which controls the rotary variable movement in either direction of the chuck; also illustrated is supplemental means, controlled by one of the output shafts, for moving the milling machine table, on which both the control device and the fixture are clamped.

Figure 27:
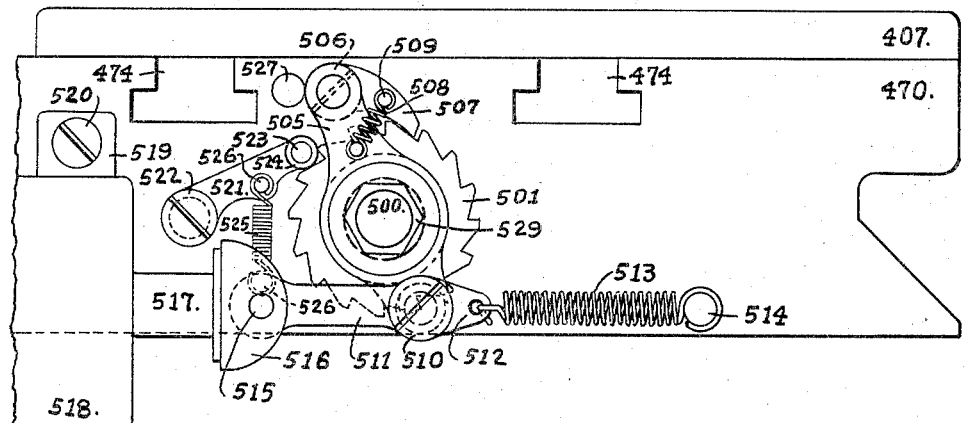

Fig. 27 is an end view in elevation taken along line 27—27 of Fig. 26 showing a solenoid and mechanical means serving to intermittently advance the milling machine table carrying both the control device and the fixture under control of one of the output shafts.

Figure 28:
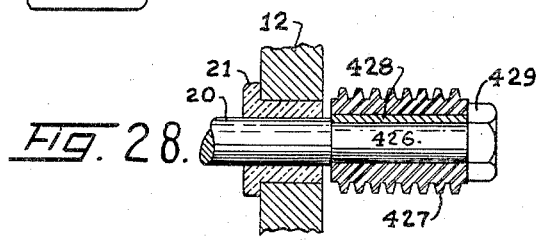

Fig. 28 is an enlarged detail view in cross-section of the worm connected to one of the output shafts, when adapted for operating the fixture.

Fig. 29 is a developed view of the cam mounted on the power shaft for modifying the normally uniform rotary movement of the record feeding wheel into a positive intermittent movement, in timed relation with the torque-amplifying mechanism.

Fig. 30 is a diagrammatic view illustrating the relative periodic movement and dwell of the various mechanisms.

Fig. 31 is a side view in elevation of the follower to the pitman pivotal connection.

Fig. 32 is a fragmentary detail side view of the off-setting geared portion of the curved arm cooperating with the record.

Fig. 33 is a side elevation of the control device covered by a hood.

Referring to the drawings, specifically Figs. 1–3, base plate 10 of the automatic control device supports two parallel vertically disposed plates 11 and 12 the lower parts of which being provided with lateral lugs 13 secured to the base plate, from the top by suitable screws 14, and from the bottom by screws 15, having relatively large heads 16 projecting downwardly from the base plate, the heads 16 serving an additional purpose of locating the device parallel to the table of the milling machine or other machine which it is to control, as will hereinafter be described.

Figure 4:
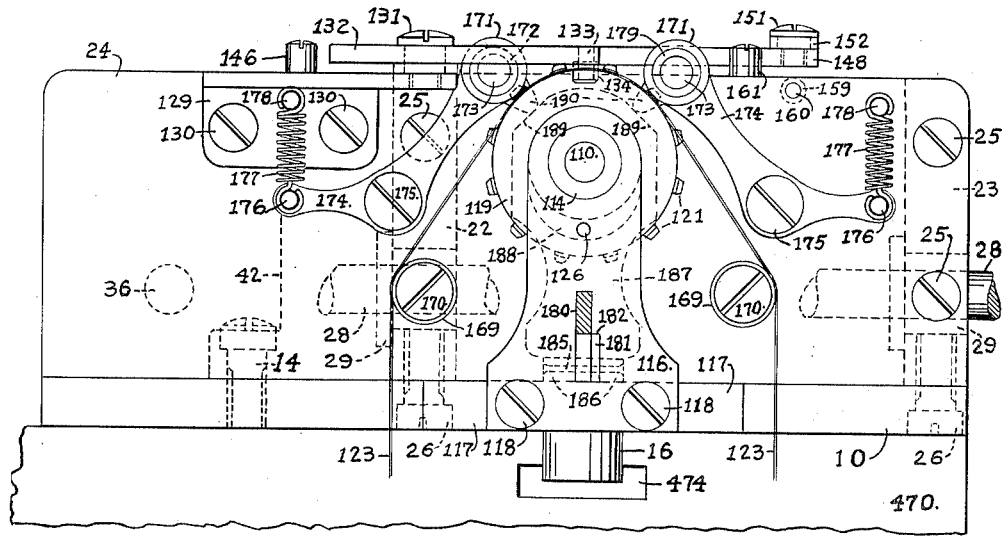
Fig. 4 is a front elevation of the device, taken along the line 4—4 in Fig. 1, illustrating the record tape feeding wheel and cooperating therewith pressure and guide rollers, all being supported on a vertically extending wall.

The horizonal shaft 17, adapted for limited and uniform swinging motion, is journaled at its ends in flanged bearings 18 secured in the upright plates 11 and 12. As shown in Figs. 3 and 4, the screw heads 16 are each located along the axis of the shaft 17, providing thereby convenient and accurate means for positioning of the device wherever applied. Extending parallel to the swinging shaft 17 at each side thereof and at equal distance therefrom and from the base plate 10 are two shafts 19 and 20, each adapted for rotary movement a variable amount in one and in the opposite direction. The shafts 19 and 20, hereinafter called output shafts, because their projecting ends outwardly from plate 12 are adapted for transmitting controlled movements to the machine which is to be controlled by the device. Output shafts 19 and 20 are each journaled in flanged bearings 21 secured by pressure in plates 11 and 12.

Parallel to plate 11 and spaced therefrom by plates 22 and 23, see Figs. 1, 2, 4 and 5, is vertically disposed plate 24 secured by screws 25 to plates 22 and 23, the latter being firmly united to the base plate 10 by screws 26 and to upright plate 11 by screws 27. At a suitable distance from the base plate and equidistant from plates 11 and 24, there is a rotatable power shaft 28, journaled in flanged bearings 29 secured to plates 22 and 23.

Figure 5:
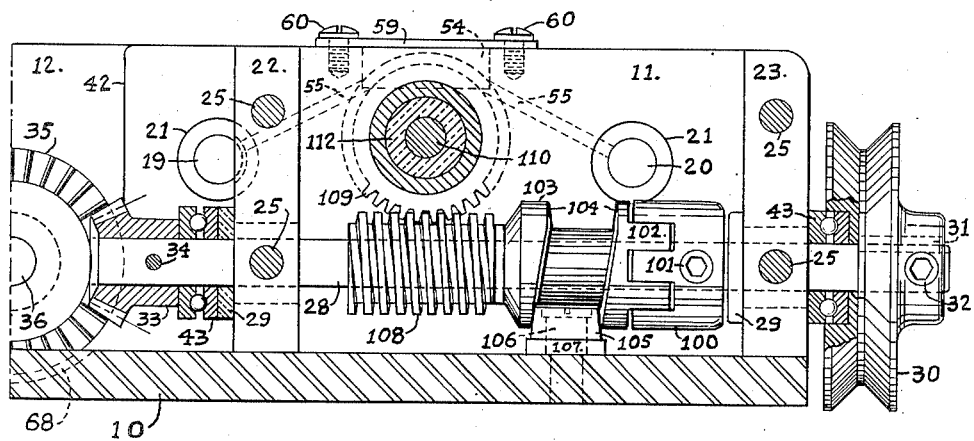
Fig. 5 is a transverse sectional view in elevation, as it appears from the rear side of the vertical wall indicated in Fig. 4 and taken along the line 5—5 of Fig. 1, illustrating the power shaft carrying a sliding clutch and a cam-worm unit engaging therewith for simultaneous rotary and axial movement, constituting a part of the record feeding mechanism.

As shown in Fig. 5, one end of the transversely exending power shaft, projecting outwardly from plate 23, is provided with a driving pulley 30 secured thereto by a key 31 and a set screw 32. Power for the shaft 28 is derived from any suitable source such as an electric motor not illustrated. The other end of the shaft 28 is provided with a bevel pinion 33 secured thereto by a pin 34. The bevel pinion is in mesh with bevel gear 35 which is twice its size mounted on shaft 36 extending longitudinally at right angle to shaft 28 and secured thereto by a pin 37 (see Fig. 1). The shaft 36 is journaled in a bearing 38 carried by a pillow block 39 secured to the base plate by screws 40, and in a flanged bearing 41 pressed into the plate 12. To avoid interference with the bevel gear 35, the upright plate 11 is made somewhat shorter at that point than the plate 12, as shown at 42 in Figs. 4 and 5.

Bevel gears have a tendency to press their respective shafts in endwise direction and to minimize this end-thrust and to maintain both shafts 28 and 36 against undue axial movement, thrust ball bearings 43 are provided on both shafts. To accommodate the thrust bearing 43 on shaft 28 the pulley 30 is recessed at 44 (see Fig. 5).

Close to plate 12, the shaft 36 carries an eccentric 45 keyed thereto at 46 and provided in addition with a set screw 47 to prevent its longitudinal displacement. Mounted on the eccentric is the motion-transmitting follower 48 held against lateral displacement on one side by the shoulder or annular rib 49 made integral with the hub 50 of the eccentric, and on the other side by a washer 51, provided with a hole engaging a pin 52 fixed in the right side of the eccentric so as to revolve with it.

The follower's bore is lined with a suitable bearing material 53, such as bronze in solid or in porous form, in order to reduce the friction between it and the hardened eccentric. The previously mentioned shaft bearings may also be made of the same bronze material, and in order that these bearings be adequately lubricated, oil reservoirs 54 on top of plates 11 and 12 are provided each with three distributing channels 55 (see Figs. 3 and 5), and an oil reservoir 56 on top of plate 12 with an oil channel 57. Lubricating means for other bearings are not illustrated but similar arrangement may be used for the purpose. Protecting cover for reservoir 56 in the form of a screw-cap 58, Figs. 1 and 3, may be provided and for oil reservoirs 54 flat cover strips 59 secured by screws 60 would serve the purpose. For convenience of servicing the reservoirs, the covers 59 may be made to swing on their respective screws by provision of arcuate slots 61.

The follower 48 is pivotally connected to a pitman 62 by a stud 63 carrying a washer 64 near its head and a locknut 65 on its end, Figs. 3 and 31. The pitman 62 is attached to shaft 17 by a key 66 and further secured thereon by a set screw 67, Figs. 1, 6 and 7.

As shown in Fig. 5 the base plate is recessed at 68 to provide operating clearance for the bevel gear 35, and as shown in Figs. 3, 6 and 7, the base plate is recessed also at 69, to provide similar clearance for the eccentric 45. A protective shield 70, shown in section in Fig. 1, is provided, secured by screws 71 to the base plate 10 and vertical plates 11 and 12 and which may be made in the shape of an inverted U, to cover the top of the device as well, see also Fig. 33. The hood 70 may have a hinged front portion 70a which may be raised for convenience of the operator when changing record tapes 123 to be described.

Referring particularly to Figs. 1 and 12, it will be noted that the oscillating shaft 17 carries two bevel gears 72 and 73, disposed with their faces opposite each other, and mutually meshing with a similar gear 74 mounted for partial rotation on a stud 75 screwed into the base plate 10. Mounted on hubs of bevel gears 72 and 73 are sector spur gears 76 and 77 respectively. The bevel gear 73 and the sector gear 77 being secured together and to the supporting shaft 17 by a pin 78, while the bevel gear 72 and the sector gear 76 being secured together off-center through their hubs by the pin 79, as illustrated in Figs. 1 and 12, thus the latter are free to swing together on shaft 17.

To effectively take up the end-thrust inherent to bevel gears, on both sides of the oscillating shaft 17 close to bearing flanges 18 thrust ball bearings 80 are provided, also a similar thrust bearing (not illustrated) may be provided between the hub of the bevel gear 74 and the base plate 10. In addition, a spacing sleeve or a tubular collar 81 is mounted on shaft 17 between faces of bevel gears 72 and 73. The sector gears 76 and 77 are in mesh, on one side, with sector gears 82 and 83, respectively, which are mounted on shaft 19, and on the other side, with sector gears 84 and 85, respectively, which are mounted on shaft 20, Fig. 1. It will be observed that sector gears 76 and 77 have gear teeth on both sides, Fig. 3, while the sector gears 82, 83, 84 and 85 have gear teeth on one side only, and that the last named four gears are free on their supporting shafts.

From the foregoing, it will be understood that when power is applied to the pulley 30 the power shaft 28 will rotate carrying with it the pinion 33 which will cause the bevel gear 35 and shaft 36 to rotate at one-half the speed of that of shaft 28, due to the difference in size between the two bevel gears. The eccentric 45 rotating with the shaft 36, and through the medium of the follower 48, stud 63 and pitman 62, will cause the shaft 17 to oscillate to the right and left for each cycle or revolution of shaft 36, the extent of oscillation being in proportion to the amount of eccentricity of the eccentric 45.

In view of the fact that bevel gear 73 and its associated sector gear 77 are both secured on shaft 17, these gears will oscillate in unison with the shaft, and as the sector gear 77 is in operative engagement with the sector gear 83 mounted on shaft 19, on one side thereof, and with sector gear 85 mounted on shaft 20, on the other side, gears 83 and 85 will likewise oscillate in conformity with gear 77, but in a direction opposite to the latter at their respective engagement points, Fig. 3.

The bevel gear 72, to which the sector gear 76 is attached, will, of course, oscillate at the same time but in the opposite direction to that of gears 73 and 77, due to their mutual engagement with the idler gear 74. The sector gear 76 being in meshing engagement with gear 82 mounted on shaft 19, on one side, and with gear 84 mounted on shaft 20, on the other side, gears 82 and 84 will likewise oscillate in the opposite direction to that of gear 76 at their respective meshing points.

From the preceding description, it should be understood that the function of bevel gears 72, 73 and 74 is to effect simultaneous oscillating movement in opposite direction of sector gear 82 to that of sector gear 83 on shaft 19, and of sector gear 84 to that of gear 85 on shaft 20, when shaft 36 is rotating.

As the amplitude of oscillations of the sector gears is determined, as already stated, by the amount of eccentricity of the eccentric 45, which is constant, and the connecting mechanism which being also invariable, the oscillations of gears 82, 83, 84 and 85 will at all times be of uniform extent; however, the number of oscillations that these gears may make per minute will depend on the speed of the power shaft 28, which may be varied to suit each particular requirement.

As illustrated in Figs. 1, 2, 3, 6, 7 and 11, the sector gears 82, 83, 84 and 85 are each provided with an operating cross-pin 86 on their upper portion, extending horizontally and having a pressed fit in said gears. These operating pins serve for transmitting power from the power shaft 28 to the associated mechanism, called motion-translating mechanism, yet to be described.

In order that the description in detail of the remainder of the mechanism may be easily followed, a preliminary summary of its function should be beneficial.

The automatic control device, for convenience of description, is divided into three main sections: (A) Record-controlled operating mechanism; (B) Motion-translating mechanism, and (C) Power-amplifying driving mechanism.

(A) Record-Controlled Operating Mechanism is for transmission of minute movements originated by a record tape to an associated mechanism for processing, i. e. to have these movements classified in sequence of various groups, direction of movement determined and assigned to corresponding output shafts, and their power increased, before their use as the controlling medium. This transmission being accomplished by a dual mechanism comprising mainly of two curved arms and two bars.

The record tape reproduces movements which previously were recorded therein, by analogy, as a phonograph record which records and then reproduces sound. And also as the latter, to be of practical use, the minute movements reproduced by the record tape are greatly amplified by an associated therewith mechanism actuated by an electric motor of the required capacity. Thus it will be understood that although the record controls the movement of the output shafts, the latter are driven by the motor.

The registry of movements to be reproduced by the control device is in the form of parallel steps of varying length suitably spaced at each side of the record tape with slopes joining the ends of adjacent control steps (see Figs. 15, 16 and 17). There may be five predetermined fixed positions at each side of the tape transversely thereof at which said parallel control steps may be located. Of the said five control steps, the outer two are effective for producing movements in one direction and the inner two for producing movements in the opposite direction of one output shaft.

The principle of control of the record tape being in the arrangement of the mechanism whereby the position occupied by each step in terms of distance, relative the central perforations of the tape (the central perforations are for guiding and driving the tape), have a definite bearing and determining factor over the type of movement of output shafts. The arrangement being such that when the inner step adjacent to the Zero step on one side of the tape is in operative engagement with the associated mechanism, one output shaft will rotate in one direction a distance equivalent to one predetermined feed-unit; when the innermost step is in operative position, the same shaft will rotate two feed-units at a time in the same direction. However, when the outer step adjacent to Zero step is in operation, the same shaft will similarly rotate one feed-unit but in the opposite direction, and two feed-units when the outermost step is in operation. The other side of the record tape is similarly effective in controlling movement of a second output shaft. The linear extent of the steps is the factor that determines the number of feed-units that will aggregate in one direction to effect a continuous rotary motion of the output shafts, and which may amount to any number required.

The five steps and their different length at each side of the record being capable of producing practically unlimited movement combinations of the output shafts, by reason of constant permutation of series of movements of length differing from one feed-unit to any desired multiple thereof, between each change of direction of movement of said shafts and dwells of varying length, and furthermore, the combination of movements of both output shafts, each rotating independently from the other, to achieve the final desired result in a machine to which the control device is being applied.

These limitless movement combinations controlled by the record at output shafts, makes the device applicable to many types of machines requiring precise and intricate protracted movements for their operation, such as milling machines, lathes, engraving machines, many types of textile and embroidery machines, including those now being controlled by the old Jacquard system.

It is obviously impossible to give here details of application of the control device to so many different machines, where in most cases only special connections would be required between the projecting ends of the output shafts of the control device and the machine to be controlled by it. However, one specific application to a milling machine for production of a difficult sample fork by a 3-dimensional operation will be later described in detail, which will make its capability and performance clearly understood and also indicate its applicability to other machines.

Brief reference to an engine lathe is also made to demonstrate the applicability of the control device to another machine-tool in general use. Those familiar with the operation of a lathe know the great variety of work which it is possible to turn out on such a machine, by manipulation of only two main slides, longitudinal and transverse, in one and in the opposite direction. The control device, due to its relatively small dimensions and weight, may conveniently be secured on the carriage of a lathe and suitable connections made between one output shaft and the compound slide set for longitudinal movement, and between the second output shaft and the transverse slide of the lathe, which in effect will convert a manually operated machine into an automatic machine, for numerous types of chuck work.

(B) Motion-Translating Mechanism is a dual mechanism, similar in structure and working in unison but independently one from the other, one being mounted on one output shaft and the other on the second output shaft. The function of the dual mechanism is to translate and direct the minute lineal movements originated by the record into rotation of their respective shafts in one and in the opposite direction, which are to be subsequently acted upon by the mechanism integrated therewith, actuated by the power shaft. Those minute movements originated by the inner control steps relative to the Zero step, being arranged by the motion-translating mechanism to rotate the output shafts in one direction, and those originated by the outer steps, being arranged to rotate said shafts in opposite direction, one side of the record controlling one output shaft and the other side the other output shaft.

An additional faculty of this mechanism is to allow aggregation of feed-units into continuous rotation of output shafts in direct proportion to the length of control steps on both sides of the record, and to cooperate with the third section of mechanism (C) in order that the classified minute movements may be amplified and transmitted to both output shafts.

(C) Torque-Amplifying Mechanism is integrated with the motion-translating mechanism, its function consists in amplifying to the required strength, which may be considerable, the sensitive directional movements produced by the record, without altering them in any other way.

The mechanism so far described, from pulley 30 to the oscillating operating pins 86, is the one defined at (C) as the torque-amplifying mechanism.

The Record Driving Mechanism will now be described in detail.

As shown in Figs. 1 and 5, the power shaft 28 carries a collar 100, adjustably secured thereto by a set screw 101, and provided with longitudinally disposed grooves adapted to receive, for sliding movement therein, laterally projecting lugs 102 integral with a cylindrical cam 103. The latter is provided with a cam-groove 104, which cooperates with a roller 105, slightly tapered to provide better contact on its sides, mounted on a shouldered stud 106 screwed into the base plate 10. A washer 107 between the roller 105 and the base plate serves to reduce friction at that point.

This arrangement results in a compound movement of the cam 103: rotation with the power shaft by reason of its sliding engagement with the collar 100, and a simultaneous limited reciprocating movement along the shaft 28, in accordance with the cam-groove formed therein, cooperating with the roller mounted on stud 106. (See the projection of the cam in Fig. 29.)

The periphery of the reduced portion of the opposite end of the cam 103 is cut into a worm 108, which is in engagement with a worm gear 109 mounted on longitudinally disposed short shaft 110 and to which it is secured by a pin 111. The shaft 110 is journaled in a bearing 112 screwed at 113 to the vertical plate 24, and in a bearing 114 having a flange 115 firmly set in the upper portion of a vertically disposed bracket 116, Fig. 2, secured to the base plate extension 117, Figs. 1, 2 and 4, by screws 118. The shaft 110 also carries a record tape feeding wheel 119, which is secured to the shaft by a pin 120, and is provided with prongs 121 centrally located on its periphery and equally spaced apart, adapted for engagement with similarly spaced apertures 122 provided in the record 123, Figs. 15, 16 and 17. At each side of the feed-wheel 119 non-rotating rings 124 and 125 are provided, which serve to support the edges of the record tape as it is advanced over the feed-wheel by the prongs 121 in cooperation with the record's apertures 122. The ring 124 is mounted on shaft 110 and is provided with a hole for engagement with a pin 126 fixed in the bracket 116, Fig. 4, to prevent its rotation. While the ring 125, a little wider than the former, and having a reduced rear portion 127 is screwed, as a nut, on the forwardly projecting threaded end 113 of bearing 112. A hardened washer 128 mounted on shaft 110, between the worm wheel and bearing 112, helps to reduce friction from the side-thrust of the worm wheel.

(A) Record-Controlled Operating Mechanism will now be described in detail. Considering the Figs. 1, 2 and 4, it will be noted that a right angle bracket 129 is secured by screws 130 to the vertical plate 24 on top of which there is a shouldered stud 131 screwed into it serving as a pivotal point for a horizontally disposed arcuate arm 132, adapted for a limited swinging movement. The shorter end of the arm 132, on its underside, carries a fixed stud 133 and a roller 134 adapted for engagement with one edge of the record tape as it proceeds over the feed-wheel 119. The longer opposite end of the arm 132 is provided with an offset portion upward with gear teeth 135, Fig. 32, for engagement with a relatively small sector gear 136, pivotally mounted on a shouldered stud. The gear 136 is also in mesh with a short rack 137, suitably secured on top of the forward end of a horizontally disposed bar 138 by rivets 139 or the like, Figs. 1 and 12.

The bar 138 is located above and along the axis of shaft 19, as can be seen in Figs. 1, 3, 6 and 7, and it is provided with lateral extensions 140 under the rack 137 and similar extensions at each side on its rear end. These extensions being of angular cross-section, are in sliding engagement in circumferential V grooves of four rollers 141, rotatably mounted on shouldered studs 142 screwed on top of plates 11 and 12. The sector gear 136 may be integral with the roller 141 above which it is mounted. The purpose of the gear 136 is to transmit the arcuate motion of the arm 132 to the bar 138, which is adapted for a limited to and fro rectilinear movement. The rollers 141, with their annular V grooves cooperating with the extensions 140 on both ends of the bar 138, being effective as guides for the latter without undue friction, which allows the arm 132 to be swung at its engagement with the record's step-like edges with comparatively slight effort, contributing thereby to long service of the record.

Normally, the bar 138 is urged toward the plate 12 by a coil spring 143 hooked with one end at a fixed pin 144 projecting downwardly from the bar 138, Fig. 12, and anchored at its opposite end to a screw-eye 145 screwed to the inner side of plate 12, thus the roller 134 of the arm 132 is urged by the intermediate connections against the edge of the record. A stop 146, screwed on top of plate 24, Figs. 1 and 4, limits the converging movement of the shorter end of arm 132 toward the record.

It will be observed in Fig. 1 that a shouldered stud 147, which is similar to stud 131, is secured on top of the upright plate 22 and acting as a pivot for a curved arm 148, having identical function as arm 132 in relation to the record tape, but effective on the opposite edge thereof.

The arm 148, near its middle, is provided with a stud 149 and a roller 150, like those of arm 132 and for the same purpose. The arm's other end is pivotally connected by a shouldered screw 151 to a short link 152, which in turn is similarly connected by a screw 153 to a horizontally disposed bar 154, Figs. 1, 2 and 12. The bar 154 overlies and is disposed along the axis of shaft 20, has lateral extensions 155 similar to extensions 140 on bar 138 and it is similarly supported for longitudinal sliding movement on four annularly grooved rollers 156 mounted on studs 157. The shouldered screw 153 is distinguished from screw 151 (see Fig. 2) in that it has a downwardly projecting extensions 158 for engagement with one end of a coil spring 159, the other end of which being anchored at a screw-eye 160 screwed to the inner side of plate 24. The function of spring 159 is to urge roller 150 of arm 148 toward the edge of the record, and to limit this movement a stop 161 (see Fig. 4), similar to stop 146, is provided on top of plate 24.

In order that rollers 134 and 150 are at all times in proper contact with the respective edges of the record tape, they must extend a little below the top surface of the feed-wheel 119, and to that end, the non-rotating rings 124—125 are provided with cut-away portions 162 to allow sufficient operating clearances for the rollers, as illustrated in Fig. 1, and for this reason said rings are made stationary. Furthermore, to prevent the edges of the record tape from wedging themselves between the rollers and the supporting arms, the latter are provided with shallow counter-bores on the lower sides of arms 132 and 148 into which the rollers extend, as shown at 163 in Fig. 2.

It will be noted from an inspection of Figs. 2, 6, 7 and 12 that bars 138 and 154 are each provided with two longitudinally disposed grooves 164, adapted to receive upwardly projecting tongues or ribs 165 integral with arcuated stop-members 166 which are securely attached to the bars by screws 167. The stop-members are each provided with three step-like lateral portions, hereinafter called stops 168, at each side thereof, as illustrated in Figs. 11 and 12. The stops 168, as their name implies, being effective as stops and constitute terminal elements of the just described record-controlled operating mechanism with which the motion-translating mechanism (B), not yet described in detail, is in constant operating engagement.

The operation of the record operating mechanism is as follows: while the power shaft 28 makes one complete revolution, the cam 103 operatively connected by its forked end 102 with the collar 100 secured on shaft 28, will likewise make one complete revolution, and simultaneously will move longitudinally on shaft 28 a limited distance and back, as governed by the contour of the cam, Fig. 29, due to the cam's engagement with the roller on fixed stud 106. As the worm 108, integral with the cam 103, is operatively connected to the worm gear 109, the compound rotary-oscillating movement of the former will have the following effect on the latter: while the worm is rotating counter-clockwise it would normally drive the worm gear clockwise, Figs. 4 and 5, however, simultaneous movement of the worm to the right, acting as would a rack, will rotate the worm gear counter-clockwise an identical amount during a portion of the rotary cycle, with the net result that the worm gear 109 will remain motionless or will dwell during the period in which these two motions, one urging the gear in one direction and the other in the opposite direction, balance themselves.

This dwell period of the worm gear 109 will last while the cam-groove 104 is in engagement with the roller 105 on portion A—B in Fig. 29, causing the worm 108 to move axially to the right as viewed in Fig. 5, but when the roller reaches point B and starts rolling along the slope of the groove on portion B—C, the cam 103 and its depending worm 108 will then be moving to the left, causing again a rack-action but in the opposite direction on the worm gear 109. This last motion will now be in a clockwise direction of the worm gear and which will be in addition to its normal clockwise rotation, resulting in its acceleration, and the lost rotating motion during the dwell period will be regained upon completion of the cycle. Thus, the worm 108 being of the single-thread type, one cycle or rotation of shaft 28 will advance the worm gear 109 one tooth in approximately 60°, while dwelling during the remaining 300° period.

This feature of dwell of the worm gear 109, resulting in intermittent feeding of the record while the elements involved remain in constant positive engagement, assures precise timing for proper engagement at various periods between the stops 168 and the elements of the motion-translating mechanism, as already mentioned and as will become evident as the description progresses further. The timing of the dwell and feeding periods of the record, relative to associated mechanism may be readily adjusted by the set screw 101.

The following means are provided to keep the record tape 123 in proper engagement with the feed-wheel 119 while in operation, and manually operating means to put the former in inoperative position to permit convenient handling of the tape during the changing or adjusting thereof.

At each side of the bracket 116, Fig. 4, there are two rollers 169 mounted for rotation on shouldered studs 170 screwed in the front side of plate 24, acting as guides for the record tape 123 toward and from the feed-wheel 119. The record tape proceeds from a suitable supply reel to the feed-wheel 119 and thence to a receiving or take-up reel. In the present application no new mechanism for transfer of record from one reel to the other is contemplated, therefore it is omitted from the drawings and the specification. In my co-pending application, Serial No. 45,728, such a record transfer and take-up mechanism has been clearly depicted and described and that or any other suitable means may be adapted for use with this device.

As best shown in Fig. 4, two spring-pressed rollers 171 independent one from the other are provided to resiliently hold the record on top of the feed-wheel 119, and to prevent hindrance with the prongs 121, the rollers 171 are provided with circumferential clearance grooves 172. Said rollers being rotatably mounted on horizontally disposed studs 173 secured to the upper ends of bell-crank levers 174 pivotally connected to shouldered studs 175 screwed to the front side of plate 24. The opposite ends of levers 174 are each provided with fixed pins 176 for engagement with one end of a coil spring 177, the other end of which is anchored to pins 178 secured to plate 24. The outer ends of studs 173 being circumferentially grooved to receive split retaining rings 179, to prevent the rollers 171 from sliding out.

An operating lever 180 is provided for simultaneously lifting both rollers 171, when changing records, Figs. 1, 2 and 4. The top of the lever is knurled, to provide better grip for the finger, and its central comparatively thin portion works in a vertical slot 181 provided in the bracket 116. The lower portion of the slot 181 is a little wider to permit the lever 180, when in its lowest position, to move slightly to the right and engage with its upper edge the step 182, which will effectively retain it in the lowermost position until with a slight downward push and thrust to the left it will again be brought to its upper normal position. The lever 180 is provided on its lower side with a blind hole slightly tapered for the reception of the pointed end of a screw 183 (see Fig. 2) screwed from the bottom in the base plate 10 and secured in the adjusted position by a short set screw 184, the screw 183 acting as a fulcrum for the lever 180. The lower end of the lever 180 is drilled to receive a horizontally disposed cross-pin 185 carrying a roller 186 at each side of the lever and which are rigidly held together by peening over the ends of the pin 185. The latter, of course, is done after the lever 180 has been inserted through the relatively narrow slot 181 in the bracket 116.

Considering Figs. 2 and 4, it will be noted that just above the rollers 186 there is a vertical member 187 adapted for limited sliding movement along the vertical plate 24, and provided with an oval hole or slot 188 adapted for sliding contact with the reduced portion 127 of the ring 125. The member 187 is further provided with cam-like inclined portions 189 on its top sides, for engagement with lugs 190 integral with the bell-crank levers 174 and disposed radially toward the shaft 110. Normally, under pressure of springs 177, the rollers 171 will ride on the record and thereby prevent it from being raised during its operation, and at the same time pressing the member 187 down, which will cause the lower end of the operating lever 180 to follow and thereby lifting its upper knurled end.

When it is desirable to put the rollers 171 out of the way, when changing record tapes for example, the operating lever 180 is depressed as far as it will go and swung slightly to the right and released, to allow it being locked in that position at 182 as long as necessary and freeing thereby the finger, which will cause the lever 180 to pivot on screw 183 raising thereby its lower end and lifting the member 187. The inclined surfaces 189 acting on lugs 190 would then be effective for raising both bell-crank levers 174 against their springs, and thereby causing the rollers 171 to move away from the feed-wheel 119. Upon release of the operating lever from its locked position on step 182 the rollers, by pressure of their springs, return to operative position, the position illustrated in the various views hereinbefore mentioned.

*The Record.*—Referring to Figs. 15, 16 and 17, it will be observed that the record tape 123 is provided with central openings 122, equally spaced apart which are adapted to be engaged by the prongs 121 of the feed-wheel 119, to prevent slippage and to be positively advanced by them. The record tape is provided with step-like portions of varying length on both edges and slopes S connecting said steps, which constitute the registry of movements which have been permanently recorded therein. The recorded movements may be accurately and repeatedly reproduced by the present automatic control device in greatly amplified form.

The record is illustrated with five control steps at each edge, which are identified throughout the Figs. 15, 16 and 17 by the following reference characters: X–1, X–2, Z (or Zero), Y–1 and Y–2, and which are connected by slopes S, but the number may, of course, be varied to suit diverse conditions. For certain types of work three control steps at each edge would be quite sufficient. In my presently pending application, Serial No. 45,728, the record is illustrated with eight different steps or undulations at each side. However, in order that the present description be as simple and clear as possible, only five control steps for each side will be considered.

The record traveling over the feed-wheel 119 may cooperate at any one time with any one of the five control steps available at each side with the rollers 134 and 150 associated therewith with which the record maintains constant contact, by the springs 143 and 159, except at Y–2 steps, by the restraining action of the fixed stops 146 and 161. The sole purpose of the latter is to arrest converging movement of arms carrying rollers 134—150 beyond the position of the deepest steps, Y–2, which normally said rollers would have reached had there been no fixed stops. For this reason, all Y–2 steps are cut slightly deeper, to avoid contact with rollers, avoiding thereby unnecessary wear of both the rollers and of Y–2 portions, while maintaining normal operation at Y–2 steps. Such a clearance between rollers 134—150 and steps Y–2 is illustrated in Figs. 16 and 17 at C.

In view of the fact that four control steps on each edge are equally spaced apart (except the steps Y–2 for reasons explained in the preceding paragraph, the slightly deeper cut of which having no influence whatsoever), and each step being invariably at a fixed distance from the central perforations 122, it follows that the positions of bars 138—154 will also invariably be in one of the five predetermined positions for each bar, in strict accordance with the corresponding step at the time in operative position.

The controlling factor of the record tape for reproducing movement is the particular position which each of the 10 control steps of the record occupies at both sides thereof in relation to the longitudinal axis at the center of perforations 122, whereby the bars 138—154, as already stated, are caused to assume corresponding positions with their terminal stops 168 affecting the movement which, after being processed and amplified by the associated mechanism, will be channeled into the output shafts. Annotations in Fig. 16 explain what effect each control step has on output shafts 19 and 20 when in operative position, in terms of a single and of a double feed-unit per cycle and also as regards their direction of movement depending on which side of the Zero step they are situated. Rollers 134—150 crossing the Zero step, from Y–1 to X–1, for instance, or vice versa, from X–1 to Y–1, will cause the rotation of output shafts to be reversed. It will also be observed in Fig. 15 that the record at the right is divided by transverse lines indicating by numerals the distance advanced by the record every time the power shaft 28 makes one complete revolution. Each step of the record may extend for one cycle (one complete revolution) of the power shaft or any multiple thereof, as required. Steps of different length are shown in Figs. 15, 16 and 17. At all points where one control step meets another, whether inwardly or outwardly, they lead into each other by slopes S of uniform angle, and each slope being of an extent not greater than a distance traveled by the record during one cycle of shaft 28, thus partial feed-units are effectively avoided. During progression of the record, the arms 132—148 with their rollers 134—150 will converge toward the record by the influence of springs 143—159, and will be caused to diverge by the slopes S, acting in cam-fashion on said rollers against said springs. The terms—one feed-unit and two feed-units—employed in the description and also in Fig. 16, means the distance rotated by either output shaft when any one of the four ratchet wheels secured thereto (not yet described) has moved a distance equivalent to one ratchet tooth or two ratchet teeth at a time per cycle of the power shaft, respectively. As indicated in the drawings, one side of the record being effective in controlling the movement of one output shaft and other side the other shaft, independently one from the other.

In the operation of this type of control, often it becomes necessary that either one or both output shafts remain motionless at the same time for a variable period while the power shaft continues rotating. This is effectively accomplished by the provision of the Zero steps, which produce no movement in the mechanism associated therewith. The position of bars 138—154 and terminal stops 168 will be as illustrated in Fig. 12 when Z steps are in operative position on both sides of the record.

It will be noted that reversals of movement of either output shaft cannot occur without the record-controlled operating mechanism passing through the Zero step, position generating no movements, which effectively precludes movements to be generated in both directions at any one time.

*Motion-Translating Mechanism.*—Referring particularly to Figs. 1, 2 and 3, it will be observed that sector gears 82, 83, 84 and 85 have hubs 200 on both sides, carrying left and right-hand members 201 and 202, as viewed in the figures respectively, adapted for free rotation thereon, the shape of which may be seen in Figs. 8, 9 and 10. These members are provided with radially disposed lugs 203 on their upper portion, adapted for operative engagement with terminal stops 186, Figs. 12 and 11, and with lobes 204 at their lower portion. The members 201, 202 are further provided with cut-away portions 205, adapted for engagement when in the operative position, with the one or the other radial abutment 206 of the cut-away portion, with the power-operating cross-pin 86. Each left-hand member 201 is connected to its companion right-hand member 202 by a coil spring 207, engaging with one end a laterally projecting fixed pin 208 on the lobe 204 of one member, and with the other a similar pin 209, located above its central bore on the other member, forming a pair, to the effect that both lugs 203 of the paired members are urged by said spring toward stops 186, Figs. 6, 7, 11, 12. In the vicinity of springs 207, the sector gears 82, 83, 84, 85 have their rear portions cut-away, as shown at 210 in Fig. 3 to provide operating clearance for such springs. The lugs 203 are provided with a reduced portion 211, see Fig. 10, to enable their engagement with stops 186 to be made at the center of their width, instead of at the side, see Fig. 12.

At this stage, it is considered expedient to reiterate for clear understanding that terminal stops 186 of the record-controlled mechanism (A) and lugs 203 of the motion-translating mechanism (B) constitute mutual connecting links of operation between the two, and the radial abutments 206 of members 201, 202 of the motion-translating mechanism (B) and operating pins 86 of the torque-amplifying mechanism (C) constitute mutual connecting links of operation between the latter two.

Pivotally connected to members 201, 202, Figs. 8, 9 and 10, by shouldered screws 212 are pawls 213 having extensions 214, carrying rollers 215, mounted on studs 216 which are fixed to extensions 214. The pawls carry fixed pins 217 entering into side openings of members 201, 202, for engagement with one end of a light coil spring 218, lodged in radially disposed holes 219 and anchored at the lower ends by cross-pins 220. Each pawl 213 cooperates with individual to it ratchet wheel 221, there being four ratchet wheels on each output shaft. The ratchet wheels on the left and right sides as viewed in Figs. 1 and 2, have individual hubs 222, but the pair of ratchet wheels located in the center have a common hub 223. The hubs 222 and 223 are secured to output shafts 19, 20, by suitable fastening means such as pins 224.

It will be noted in Figs. 6, 7 and 11, that ratchet wheels mounted at each side of members 201, 202, forming a pair, have their teeth in opposite directions. In Fig. 1, little arrows on ratchet wheels indicate operating direction of their teeth. Spacing collars 225 on both output shafts prevent axial displacement of parts mounted thereon.

The Auxiliary Mechanism now to be described and forming an important part of the motion-translating mechanism, is illustrated in Figs. 13 and 14 and also in the lower part of the Figs. 6, 7 and 11. It serves a dual purpose: I. To insure free sliding movement of bars 138—154, carrying stops 186, during periods of their movement from pressure-contacts with lugs 203 under influence of springs 207, which would have put an unnecessary strain on the record tape 123; and, II. To enable reverse rotation of output shafts in timed relation with the terminal stops 186, the latter having a definite piston-relationship with the record tape (10 in number, as previously explained).

A grooved cam 226, Figs. 1 and 13, is adjustably secured with its hub portion by a set screw 227 to shaft 36 and it is in cooperation with a roller 228 mounted on shouldered stud 229, screwed to one end of horizontally disposed inverted T shaped lever 230, pivotally mounted on shouldered stud 231 screwed into the base plate 10. A washer 232, between the pivotally mounted lever and the base, serves to reduce friction at that point. The lever 230 is connected by shouldered screws 233 to transversely disposed bars 234, which at their opposite ends are connected by similar screws to horizontally disposed lever 235, mounted in its center for slight swinging movement on shouldered stud 236, screwed into the base plate. A washer similar to 232 is beneath the lever 235.

As best illustrated in Figs. 2 and 10, the lobes 204 have their inner sides somewhat reduced at 237, to provide operating clearance for bars 234. The latter have a right-angle cross-section projecting downwardly at their central portion 238, Figs. 13 and 14, each carries four short links 239 disposed in pairs and mounted for mutual pivotal connection on common shouldered studs 240. The studs are connected suitably to vertical portions 238.

The lower links 239 of each pair also are pivotally connected by shouldered studs 241 to ears 242 integral with both the hubs 243 and with an upwardly projecting curved lever 244 on each hub, secured by pins 245 to longitudinally disposed parallel shafts 246, 247, 248 and 249, respectively. The latter are journaled in bearings 250 (Fig. 3) secured in plates 11 and 12 with their one end, and in the vertical portion of central bearings 251 the lower horizontal bracket portion 252 for the bearings 251 is secured to the base plate by screws 253, with their other end. As shown in Fig. 3, the axes of shafts 246 and 247 are disposed in the same vertical plane with shaft 19, and shafts 248 and 249 are disposed in the same vertical plane with shaft 20. Suitable operating clearances 254 in the base plate, best illustrated in Fig. 14, avoid interference of the links and ears 242 with the base plate 10.

The upper links 239 of each pair are similarly connected by studs 255 to ears 256 integral with the hubs 257 and two lugs or short levers 258 and 259, projecting obliquely from each hub, loosely mounted on respective shafts 246, 247, 248 and 249. At each side of the bearings 251 and adjacent to hubs 257 there are still other hubs 260, each integral with a curved lever 261 similar to lever 244, securely mounted on said shafts by pins 262. The upper portion of each curved lever 244, 261, see Figs. 6 and 7, are formed in an arc concentric with the axis of respective output shafts, when in operative position, as indicated at 263. The shafts 246, 247, 248, 249 are provided with spacing collars 264, Fig. 13.

By inspection of Figs. 13, 6 and 7, it will be observed that the curved levers 244 projecting from the hubs 243 are located on one side of their respective shafts, while the curved levers 261 projecting from hubs 260 are located on the opposite side thereof, and also that the short levers 258 and 259 of each hub 257 are similarly disposed on opposite sides of their respective shafts. There being one curved lever, 244 or 261, for each roller 215 forming part of pawls 213, and likewise, one lever, 258 or 259, for each lobs 204 of members 201, 202, with which they are adapted to cooperate at various periods, as governed by the cam 226. For this reason, these elements are so disposed axially on their respective shafts as to be in proper perpendicular operating engagement one with the other, Figs. 1 and 13.

In view of the fact that one link 239 of each pair connects above and the other below the shaft carrying the elements to which they are pivotally engaged, Fig. 14, it therefore follows that the elements connected to the links disposed above the shafts are impelled in the opposite direction to those connected to links disposed below the shafts. With particular reference to Fig. 13, it will be observed that when the cam 226 is rotated, due to the central pivotal mounting of levers 230 and 235, the relatively long bars 234 will oscillate a slight amount simultaneously in opposite direction one relative the other, each bar carrying along its respective links 239. From this it will be understood that all the movements effected by the links 239 connected to one bar 234 on the elements carried by shafts 246 and 247 will be exactly in the opposite direction to similar elements carried by the shafts 248 and 249, effected by the links connected to the other bar 234. These elements are shown in one position in Fig. 6 and in the alternate position in Fig. 7, occurring upon reciprocation of the bars 234. It will also be observed that the movements in both directions effectuated simultaneously by the long bars 234, the curved levers 244, 261 and the short levers 258, 259 being actuated by a single cam 226, which assures coordination of the elements involved.

This opposite direction of movement of the elements impelled by one bar 234 as regard those impelled by the other bar, is required to maintain proper timing relationship with the elements they are to act upon, as it will be recalled that sector gears 83—85 oscillate in the opposite direction to sector gears 82—84, by the action of the idler-gear 74, see Figs. 1, 2 and 3. Referring again to Figs. 6 and 7, it will be noted that, depending on the position of the cam 226, one pawl 213 or the other of the unit, formed by one right-hand 202 and one left-hand 201 members, will be lifted above the teeth of its associated ratchet wheel, by the action of one curved lever 244 or 261, while the companion curved lever on the same shaft will be in inoperative position with the other pawl, of the same unit and therefore said other pawl will be in engagement with its ratchet wheel. Similarly, one of the short levers 258 or 259 will be in contact with the associated therewith lobe 204, while a companion short lever will be at the time in inoperative position. As already stated, these relative positions of curved levers and of short levers, as regard their companions disposed on the same shafts, will be reversed on cam's 226 continued rotation.

It will be noted in Figs. 6 and 7 that a slight operating clearance 265 is provided between lugs 203 and the stop-members 166, when in the illustrated position at regular intervals, at which the bars 138—154, to which said stop-members are attached, are shifted slightly in one direction by springs 143—149 and in the opposite direction by slopes S of the record tape 123 against said springs. This clearance frees the bars 138 and 154, during their period of movement, from the pressure contact of the lugs 203 and thus enables the bars 138 and 154 to shift without effort on rollers 141 and 156, obviating thereby needless strain on the record tape 123.

The clearance 265 is provided automatically by the operating pins' 86 normal extent of movement, by the adjustment of the parts, at each side of the stop-members 166 in its reciprocating engagement with the radial abutment 206 of members 201—202, but the clearance on the side opposite to that at the time in engagement with the pins 86, is effected by the short levers 258—259 acting upon respective lobes 204, against the action of springs 207, and in timed relation with the movement of the pins 86 by the controlled action of cam 226. The movement produced by levers 258 and 259 on lobes need not be extensive, as an operating clearance of .020" to .030" between stop-members 166 and lugs 203 should be adequate. The foregoing is the only function of short levers 258 and 259, but contributes to smooth performance and lasting service of the record tape 123.

As illustrated in Figs. 6 and 7, there is a definite correlative relationship between the lifted pawls 213 and the position, right and left, of the adjacent operating pins 86, which occurs at a certain predetermined period of rotation of the shaft 36, carrying both the cam 226 controlling the lifting movement of pawls, and the eccentric 45 controlling the movement of the operating pins 86, assuring thereby synchronization of both movements. However, while comparing Figs. 6–7 with Fig. 11, it will be noted that the relationship between the lifted pawls and the positions of pins 86 has been altered. For clear understanding of the relative movements just described, the diagram of Fig. 30 should be consulted, wherein the three controlling elements of periods of dwell and movement are related; namely, the cam 103 on power shaft controlling the movement of the record tape 123, the cam 226 controlling the movement of the auxiliary mechanism comprising both the curved levers 244 and 261, and the short levers 258 and 259, and finally, the eccentric 45 controlling the reciprocating movement of the operating pins 86—are each shown in relative position at any one period of one cycle or revolution of the shaft 36. It must be pointed out here that what appears to be a discrepancy between Figs. 30 and 29, in which the advance movement of cam 103 is indicated in the former as being 30° and in the latter as 60°, is due to the fact that the power shaft 28 rotates twice as fast as the shaft 36, the latter being the central point of the diagram.

The purpose of alternate lifting of two pawls on one side of each shaft 19—20, making them thereby inoperative, while simultaneously releasing two pawls on the other side thereof, which occurs at dwell periods of pins 86, is to enable the latter, during their normal oscillating movement, to move that ratchet wheel 221 and thereby the output shaft, which has teeth in the same direction in which the pins 86 are moving at the time at the side of the shaft having pawls released. The arrangement of the elements being such that regardless of the direction in which the pins 86 will be moving, there will always be one ratchet wheel (and no more than one per output shaft) with teeth in the same direction to be engaged, the other three ratchets on the same shaft being inoperative. This is explainable by the fact that two ratchet wheels on the right side of each output shaft have their teeth counter-clockwise, while those on the left side have two ratchet wheels with teeth in the clockwise direction, see Figs. 6, 7 and 11 and also the arrows on ratchet wheels in Fig. 1. Also, because one pin 86 oscillates at all times in the opposite direction to the second pin on the same shaft. It follows, therefore, that the pin 86 moving in the opposite direction to that of teeth of a ratchet wheel will cause its pawl to idly backslide over the ratchet teeth by the action of spring 207, and the other operating pin on the same shaft moving in the same direction of ratchet teeth will cause its pawl to move the ratchet and the output shaft on which it is secured.

The normal simultaneous reversal of the direction of movement of pins 86, and alternate position of pawls, have no effect on the direction of movement of output shafts, such movement is determined by the record.

The integrated mechanism now being described, comprises elements of the motion-translating mechanism with its auxiliary mechanism and the torque-amplifying mechanism, the movement and function of which might possibly be difficult to understand, due to their constant change of position relative to one another during a cycle of operation.

From the foregoing description, it will be understood that the elements carried by shaft 19 are similar in structure and function to those on shaft 20, hence for the sake of simplicity, only one output shaft and the elements carried by it should hereinafter be considered. And, it should also be noted that one-half of elements carried by each output shaft, although structurally and functionally alike, move simultaneously in an opposite direction to those of the second half, by the action of the idler-gear 74; and, likewise, the elements of the auxiliary mechanism are equally divided for simultaneous movement in opposite directions, by the bars 234 and pivotal mounting of levers 230, 235. Furthermore, one-half of elements comprising one sector gear 82 or 83 of shaft 19 with the operating pin 86 attached thereto, one left-hand member 201, one right-hand member 202, one pawl 213 and one ratchet wheel 221 with teeth in the clockwise direction and another pawl and ratchet with teeth in the counter-clockwise direction, form a unit. Consequently, only one-half of the elements on one output shaft and one-half of the auxiliary mechanism cooperating therewith, should be considered in order to facilitate understanding of the constantly changing position of the several parts relative to each other.

As stated before, the timing of movement of the various mechanisms of the device is accomplished by three elements: cam 103 controlling the feed of the record, cam 226 controlling the auxiliary mechanism and the eccentric 45 controlling the torque-amplifying mechanism, each moving and dwelling at coordinated periods, substantially as indicated by a diagram in Fig. 30. Cams 103 and 226 may each be conveniently adjusted on their respective shafts, so that their periodic operative and inoperative position may coincide with the position of the eccentric 45, which, as is common to all eccentrics, has a period of acceleration, deceleration and dwell, in succession twice per revolution, the dwells not being absolute, but for all practical purposes quite effective as a dwell, because only minute movements being effected at dwell periods, by the elements connected to the eccentric.

As an alternative means for actuating the torque-amplifying mechanism, in lieu of the single eccentric 45, a twin-eccentric may be used, which is illustrated in Figs. 18, 19 and 20. The main advantage obtained from this construction is the prolongation of the dwell periods. The twin-eccentrics 300 and 301, of equal eccentricity, flanking each other and having their eccentric portions disposed approximately 60° apart, as indicated at A—C in Fig. 19, are mounted on shaft 36 and both secured thereto by a key 302 and a set screw 303. As illustrated in Fig. 18, the shaft 36 carrying the twin-eccentrics at its end, projects outwardly from plate 12, and to provide adequate spacing between them at that point, the flange of bearing 41 is disposed on the outer side of plate 12. To avoid interference with the lug 13, shown in Figs. 1 and 13 on the right side of plate 12, it may as well be located on the left side, as shown in Fig. 18. The eccentric on the right is provided with a rib 304 and a hub portion 305, similar to the rib 49 and hub 50, respectively, of eccentric 45, see Fig. 1, and the one on the left with a rib 306 integral with the eccentric. Two followers 307 and 308 having their bores lined with a suitable anti-friction material 309, are mounted on the eccentrics, and are offset at 310. Their opposite ends are pivotally connected, by suitable shouldered studs 311, washers 312, and nuts 313, to a short vertically disposed link 314. The central portion of the link 314 is pivotally connected to the pitman 62, by a shouldered stud 315 secured in the link, passing through the pitman and fastened by a washer 316 and a nut 317. The shaft 17 projects from plate 12 for engagement with pitman 62. The plate 12 is recessed at 318 to provide operating clearance for the hub of pitman 62. A thin washer 319 on shaft 36 serves to keep the twin-eccentrics slightly apart.

The operation of twin-eccentrics is as follows: When the shaft 36 revolves, both eccentrics simultaneously will cause the link 314 to swing slightly at the dwell periods, one follower pulling or pushing (depending upon which side of shaft 36 the eccentrics are at the time) and the other follower being almost immobile at their respective connecting points with the link 314, due to the relative angular position of one eccentric to its companion with the result that there is practically no movement of the pitman 62. This simultaneous pulling or pushing on one end of the link and a standstill of the other end, is effected by the action of one follower reaching the terminus of its reciprocal movement and thereby ceasing momentarily its further action, while its twin follower still in deceleration stage at the time continues moving the link, resulting in a slight swinging movement of the latter, which adds to the normal dwell period. However, after the dwell period of both eccentrics has ended and acceleration is in effect which is succeeded by deceleration (though at different stage, due to their relative angular position), the link 314 will then be actuated at both its ends at the same time, which, by reason of its central pivotal connection to pitman 62, will cause the latter to swing to one side after a dwell of the eccentrics, then to the opposite side after another dwell, for every revolution of the shaft 36.

Still another modification for operating the shaft 17 is illustrated in Figs. 21 and 22. A peripheral cam 350, having equal dwell periods of the required degree in extent at both its lowest and the diametrically opposite highest portions, is adapted for cooperation with two rollers 351 mounted on shouldered studs 352 screwed into the side of a cam-follower 353 having an elongated slot 354 in which a roller 355 loosely mounted on shaft 36 is cooperating. The cam 350 is secured to shaft 36 by a key 356 and a set screw 357. The opposite end of the follower 353 is pivotally connected to a pitman 362 by a stud 363, a washer and a lock-nut in a manner similar to corresponding members 62 to 65, inclusive, in Fig. 31. The cam 350 may be located on the inner side of plate 12, in the place of the single eccentric 45, or in the place of the dual eccentrics 300 and 301 on the outer side of the plate, as desired. For one-half revolution of shaft 36, the cam 350 acting on one roller 351 will oscillate the pitman 362 in one direction, and during the following one-half revolution, the cam acting on the second roller 351 will oscillate the pitman in the opposite direction. Thus, the cam 350 will be in constant positive engagement with the follower 353.

The structure, disposition and relationship of the parts forming part of the combined mechanism of the device having been described in detail, their operation will now be described. Thereafter, a description of a milling machine fixture directly connected to the control device will be given in order to illustrate a representative application of the control device to a conventional machine in general use. The illustration will show the applicability of the device to a 3-dimensional operation, on precision-work having constantly changing dimensions throughout its length.

*Operation of the Control Device.*—A complete revolution by the power shaft 28 (one cycle) will cause the feed-wheel 119 to advance the record tape 123 a distance indicated by vertical dot-dash lines and numerals at the right of Fig. 15. When Zero steps on both sides of the record are in engagement with the respective rollers 134, 150, the arms 132 and 148 will then be disposed as illustrated in Fig. 1, and the bars 138 and 154, operatively connected to said arms and each carrying two stop-members 166, will then be disposed as illustrated in Fig. 12. The terminal stops 168, forming part of stop-members 166, will then be, at both sides of said bars, in the position of restraint on lugs 203 of members 201 and 202, and the latter on both output shafts will then be disposed as illustrated in Figs. 6 and 7. As before stated, while in this restraining position of all members 201 and 202, the latter cannot be engaged by the operating pins 86, actuated by the power shaft independently from the record tape 123, consequently, the pins 86 will swing idly from one radial abutment 206 to the other without in any way affecting the position assumed at that time by both output shafts 19 and 20.

However, when any one of the four available control steps X–1, X–2, Y–1 and Y–2 is in operative position at either side of the record, the terminal stops 168 of the record-controlled operating mechanism will position themselves accordingly, which will directly affect the position that the lugs 203 of members 201 and 202 will assume immediately thereafter, being in intermittent operating engagement with the lugs. The repositioning of the members 201 and 202 enables the corresponding pin 86 to engage the radial abutment 206 of that member 201 or 202 which responded to the particular stop 168 of the member 166 at the time in operative position, and will transmit the movement, amplified many fold in the corresponding direction and, to the corresponding output shaft.

As illustrated in Fig. 12, the stop-members 166 are each provided with three stop positions or terminal stops 168 at each side of bars 138, 154, adapted for engagement with the respective lugs 203: the stop on the outer edge, the middle-stop and the bottom-stop, the latter flush with the bars 138 and 154 as viewed in Fig. 12. The engagement of lugs 203 with stops 168 at the outer edges of stop-members 166 is illustrated in Fig. 12 and also in Figs. 6 and 7, except for clearances 265 occurring at those points during advance periods of the record tape 123; while such engagement with the middle-stop and bottom-stop 168 are illustrated in Fig. 11, wherein the lug 203 of a member 202 mounted on shaft 19 is in engagement with the bottom-stop 168, and the lug 203 of a member 202 mounted on shaft 20 is in engagement with the middle-stop 168. In Fig. 11, the position of the operating pins 86 is at the left terminus of its reciprocating movement and is the same as that illustrated in Fig. 6. The following movement of the pins 86, therefore, will be to the right terminus, which would place them in the position illustrated in Fig. 7.

The fact that the lugs 203 of both output shafts have contacted terminal stops 168, as just mentioned and as illustrated in Fig. 11, indicates that the dwell period of the operating pins 86 has just ended, during which period this engagement took place, and hence accelerating movement which will be followed by the deceleration is going to start. During this movement of pins 86, from left to right, their path previously unobstructed because Zero steps of the record were in operative position, are now barred by the radial abutments 206 of members 202, which the pins 86 will have no difficulty in pulling being powered by the power shaft, and when the pins 86 complete their movement to the right, the position of both members 202 will then be restored to that illustrated in Fig. 7. It will be recalled that each member 202 carries a pawl 213, see Fig. 9, normally in engagement with the respective ratchet wheel 221 by a spring 218. It will be noted in Figs. 6, 7, 8, 9 and 11, that pawls 213 on members 201 are engaged with ratchet wheels having teeth in the counter-clockwise direction, and those of members 202 with ratchet wheels having teeth in the clockwise direction. Therefore, when the lugs 203 have engaged the middle-stop 168 on shaft 20 and the bottom-stop 168 on shaft 19, respectively, Fig. 11, their respective pawls 213 backslided over the teeth of their ratchet wheels, by the action of springs 207, one tooth plus a clearance on shaft 20 and two teeth plus a clearance on shaft 19, in the counter-clockwise direction. This clearance is provided to insure at all times proper engagement of pawls with the ratchet wheels, by preventing friction with the faces of the teeth during their engagement, which the light springs 218 would have difficulty in surmounting. Such clearance is apparent in Fig. 11, between the operating ends of the raised pawls 213 of members 201 and the ratchet teeth. Upon release of the pawls by the curved levers 244, 261, they will engage the ratchet wheels at near mid-point between the teeth.

During the movement of the operating pins 86 to the right, the one on shaft 19 being in engagement with the radial abutment 206 of member 202, Fig. 11, the pin 86 will pull said member along to the right terminus of its travel, as before stated, which, by reason of its pawl engagement with the ratchet wheel, the latter and shaft 19 will be rotated a distance equivalent to two ratchet teeth, or two feed-units, in the clockwise direction, which corresponds to the two teeth the same pawl previously backslided over the ratchet wheel when its lug 203 was moving toward the bottom-stop 168 by the action of its spring 207. But the pin 86 on shaft 20 during its movement to the right will have its path half-way unobstructed before it reaches the radial abutment 206 of member 202, and therefore during this portion of its travel no movement will result to shaft 20. However, when the pin does reach the abutment 206, the member 202 will be pulled to the right by the pin 86 and the pawl 213 connected thereto will rotate its ratchet 221 and shaft 20 a distance equivalent to one ratchet tooth, or one feed-unit, in the clockwise direction, and which corresponds to the one tooth previously backslided by the same pawl when its lug 203 was moving toward the middle-stop 168 by the action of spring 207.

The clearance between the pawls and the ratchet teeth, mentioned above, have no effect on movements transmitted to output shafts, because no movement is transmitted until the pawl reaches the face of the tooth and engages it, and once engaged the pawl may drive it a distance equivalent to one feed-unit or two feed-units per cycle of shaft 28. It should be clearly understood that the operating pins 86, by engagement with radial abutments 206, force the members 201 and 202 from the terminal stops with which the lugs 203 may be in contact, but never toward the stops 168. The lugs 203 of members 201 and lugs 203 of members 202, on the same output shaft, being urged alternately toward the stops 168, by the springs 207 common to both of a unit in the periods they are not restrained either by the normal action of pins 86 or by the short levers 258—259.

From the foregoing description of Fig. 11, it will be appreciated that the normal movement of operating pins 86 on members 202, having their lugs 203 in engagement with the middle-stop and bottom-stop 168, respectively, effected one feed-unit movement to shaft 20 and two feed-units movement to shaft 19, both movements in the clockwise direction. From data in Fig. 16 one can obtain the information that such movements for shafts 19 and 20 can be effected by steps X–2 of the record for the former, and by steps X–1 for the latter. Should, for instance, the steps X–2 and X–1 be substituted by Y–2 and Y–1, respectively, in the operative position of the record, the shafts 19 and 20 would still be rotated the same two feed-units and one feed-unit, respectively, but in the counter-clockwise direction.

In Fig. 16, there are certain data relative to the reversal of direction of movement of output shafts, when steps X–1 and X–2 are substituted by Y–1 and Y–2, or vice versa, in the operative position. The mechanism responsible for this reversal of movement will now be described in detail.

When the rollers 134 and 150 are in engagement with the record at both sides thereof at Zero steps, as shown in Fig. 15, the arms 132 and 148 to which these rollers are connected will assume the position illustrated in Fig. 1, and the position of both bars 138 and 154 will then be, as illustrated in Figs. 12, 6 and 7, effective in preventing all the lugs 203 of members 201 and 202 from converging toward the middle-stops or the bottom-stops 168, and thereby neutralizing the effectiveness of the members 201 and 202 in transmitting movement to the output shafts. During the advance of the record, rollers 134 and 150 riding over its edges will converge from Zero steps into Y–1 or Y–2 steps, or diverge over steps X–1 or X–2. Correlating with this movement of the rollers 134 and 150, the bars 138, 154 will be shifted in their guide-rollers 141 and 156, right or left, one space or double space, depending, respectively, whether said rollers converge or diverge, and also whether they contact X–1, Y–1 steps or X–2, Y–2 steps. As shown in Fig. 1, the relative position of rollers 134 and 150 on arms 132 and 148, to that of the point of engagement at the longer ends of said arms with bars 138 and 154, respectively, is the reason why the corresponding shifting of said bars is more than double in extent than that of the rollers, when moving from one step to another on the record.

Referring again to Fig. 12, it will be noted that each bar 138 and 154 carries two stop-members 166, the arrangement of which being such that when said bars are shifted in either direction one space, corresponding to the movement of rollers 134 and 150 from Zero step to either X–1 or Y–1 step, the outer edge of stop-members, on one side of each output shaft, will still be effective for restraining lugs 203 from converging movement as when the Zero step was in operative position; while on the other side of each output shafts at the time, the middle-stops 168 on each stop-member 166 will be subject for engagement with lugs 203, which will result in one feed-unit movement to output shafts. Similarly, when said bars are shifted in either direction two consecutive spaces, corresponding again to the movement of rollers from Zero position to either X–2 or Y–2 steps, the outer edge of stop-members 166 will still be in the restraining position on lugs 203, on one side of each output shaft; while on the other side of each output shaft at the time, the bottom-stop 168 on each stop-member 166 will be exposed for engagement with lugs 203, which will result in a two feed-units movement to output shafts.

This restraining position on two lugs 203 disposed on one side of each output shaft, while exposing for engagement the middle or bottom-stops 168 to lugs disposed on the other side of said shafts, occurring in unison with the record's influence on rollers 134 and 150, is due to the comparatively wider outer edge of stop-members 166 to that of middle-stops 168, and also to the particular arrangement of the middle and bottom stops 168 at each side of stop-members 166, as illustrated in Fig. 12. This arrangement of stop-members 166 contributes to processing of movements originated by the record tape, as to their direction, clockwise or counter-clockwise, and their extent in terms of one or two feed-units, by the motion-translating mechanism, which in turn will so position some of its elements as to be engaged by the operating pins 86, actuated by the power shaft, for amplification and transmission of the classified movements to the respective output shafts.

From the foregoing, it was noted that when bars 138 and 154 shift in either direction from the position illustrated in Fig. 12, two lugs 203 disposed on one side of each output shaft may engage the middle or the bottom-stops 168, depending whether X–1, Y–1 or X–2, Y–2 are in operative position at the time, i. e., said stops will be exposed for such engagement. However, only one lug 203 of the mentioned two, will be in the position to do so, because, it will be remembered, the operating pins 86 oscillating freely on each output shaft move simultaneously in the opposite direction one to the other, by the influence of the idler-gear 74. Hence, the pin 86 moving at the time in the direction opposite to that of lug's normal converging movement toward the stops 168, that lug can not contact the stop by the urge of spring 207, but its companion on the same side of output shaft can do so, because the other pin 86 moves at the time in the same direction therewith. From the preceding, it will be understood that when the record tape is in operative position with steps other than Zero steps, the arrangement of the mechanism just described enable only one pawl 213, of the four disposed on each output shaft, to be effective in rotating the respective ratchet wheel, in accordance with the record tape, during which time two pawls are lifted by the curved levers 244, 261 and one pawl is backsliding over the teeth of its ratchet wheel.

It will be noted that an obvious similarity exists between the manner the control steps on the record tape and stops 168 on bars 138 and 154 execute their respective functions. As before stated, the slopes S on the record tape connect the ends of adjacent parallel steps. One main controlling factor of the record tape for reproducing movements that previously were recorded therein, is the predetermined position of each of the ten steps that may be formed on the two edges of the record, relative to the longitudinal axis located at the center of perforations 122, which affects the position of elements (stops 168) associated therewith, which in turn affects the position of lugs 203, which, finally, affects the movement transmitted to both output shafts, in greatly amplified form, by an independent from the record power source. The stops on the outer edges of stop-members 166, the middle-stops and the bottom-stops 168 corresponding to Zero-steps, X–1, Y–1 steps and X–2, Y–2 steps, respectively, as to effect produced.

Several important advantages are derived from the intermediate function performed by the stop-members 166 with their stops 168, between the record and the motion-translating mechanism: I. It enables the use of comparatively thin and narrow record tape for long lasting performance in a function, which otherwise would have required that a much heavier record be used if such record were used in place of stops 168 which are in constant contact with lugs 203; II. The great structural and operational convenience in having the record feeding mechanism and the record-controlled operating mechanism widely spaced apart, yet both acting in synchronism as a unit; III. The stop-members 166 may be made of rigid and wear resisting material for a long service, yet easily replaceable at a nominal cost; and, IV. The record may conveniently be substituted without any manipulation or adjustment being required in the associated mechanism.

The arrangement of the mechanism whereby one revolution of the shaft 36, actuates the pins 86 in one then in the opposite direction, and the auxiliary mechanism associated therewith effective in alternating the position of the cooperating elements in unison with the oscillating movement of said pins, to sustain at all times the mutual relationship, is to obtain efficiency (two cycles of movements per oscillation of pins 86, instead of one), but such arrangement is also to achieve smoother rotation of output shafts when they are being rotated in one direction for a substantial number of feed-units, as very often required. The successive mechanical impulses are so arranged that at the instant one impulse has reached the end of its forward stroke another begins its stroke, while the former retrogrades in preparation for the next forward thrust. The sustained rotation of output shafts in one direction may be compared with a crank-shaft of a double piston engine, in which the strokes of the pistons succeed each other to produce practically smooth rotation of the crank-shaft.

From the foregoing description it should be understood that the record-feeding mechanism, illustrated in Figs. 2, 4 and 5, and the torque-amplifying mechanism, illustrated in Figs. 1, 2, 3, 6, 7, 11 and 12, are both connected to and actuated by the power shaft 28. Feeding of the record tape by the power shaft causes the record tape to generate relatively feeble control motions, which are transmitted by the record-controlled operating mechanism to the dual motion-translating mechanism mounted on both output shafts 19 and 20. Even though the prime mover's power driving the power shaft may be considerable, the control motions generated by the record tape are not in proportion therewith, but are within the physical limitations imposed by the rigidity of the relatively thin record tape. The torque-amplifying mechanism, which is integrated with the motion-translating mechanism, serves to amplify or increase the power of said feeble control motions of the tape to the full capacity of the prime mover, which amplified control motions are effective in operating the output shafts, in strict accordance with the control impulses of the record tape.

Several factors are responsible for the limitless variety of movement combinations possible with this device. The record is capable of generating four basic movements at each edge, plus Zero or no-movement: one feed-unit of predetermined extent and a double feed-unit per cycle in one direction, a single and a double feed-unit in the opposite direction, and the Zero-no-movement unit, totalling 25 (5×5) basic movement combinations at both sides of the record, and in amplified condition at both output shafts. The Zero-position of the record, not capable per se of generating movement, is however as important for movement combinations as the other basic units mentioned. The Zero-unit of the record, as its counterpart 0 in the numerical figures, is capable of changing the result obtained from other units, by its position, repetition or both. In the following description of operation of the control device in a milling operation, this point will be further clarified. In the meantime, by an additional reference to an engine lathe, to which this device is readily applicable, the effectiveness of short or long periods of no-movement, intermingled with movements of varying extent, of one output shaft connected to the longitudinal slide, and likewise, short or long periods of no-movement, between movements of varying extent, of the second output shaft connected to the transverse slide of the lathe, will be obvious to all those familiar with the operation of a lathe.

The 25 basic movement combinations at both output shafts are capable of being immensely increased by an addition of a modifying factor, consisting in the faculty of varying the extent of each movement, by aggregation of the primary one and two feed-units per cycle into any required multiple thereof, between each reversal of movement or dwell. Obviously, a movement equivalent to one feed-unit of say .015″, another sustained movement of 1.188″, a third of .032″, a fourth of 3.125″, etc. for one output shaft, and movements different in extent, between reversals of movements or dwell of the second output shaft, both shafts cooperating for mutual effect, for instance, would produce a different result than if all movements be of identical extent of say .032″. This, also, will become evident from later description of the milling of a sample-work. By introduction of still another modifying factor, as will also be explained later, the wide range of movement combinations may still further be increased.

In most cases where a series of movements of a machine tool, lathe, milling machine, engraving machine or the like, may be predetermined, for production of components by a 2-dimensional or a 3-dimensional operation, or of a textile or of an embroidery machine, for production of complicated pattern-designs, these movements may be permanently recorded on the record, by forming control steps of a uniform pattern in its edges, from data taken from blueprints, and then these movements reproduced any desired number of times in those machines, automatically and to a high degree of speed and accuracy, by elimination of the human factor.

Application of the control device to a conventional vertical milling machine, for automatic milling of a structurally complex airplane component, by a 3-dimensional process, in multiple on the same machine, will now be described, so that the operational features of the control device will be better understood.

A turbojet aircraft component 400, illustrated in Figs. 23 and 26, has been selected for the sample-work of the description because of its exacting irregular helical contour, having partly concentric and partly tangent surfaces gradually tapered from one end to the other; because extreme uniformity and accuracy is required in their production; and because of constantly differing dimensions over its entire length. The relative position of four turbo-blades 400 held in a chuck during the milling operation are illustrated in dotted lines in Fig. 25 at a certain transverse point which, as before stated, the profile of each blade varies at all points of its length. It will be noted in that figure that each blade has a partly concentric portion, A, a tangent portion B, a comparatively thick leading-edge C, and a thin trailing edge D. The exact shape and dimensions of turbo-blades 400 are of no particular interest in this description, except to show how its intricate structure, or a similar complex piece of work, may be machined by a 3-dimensional operation, by connections to the output shafts of a fixture supporting the blades, at close range thereto for the sake of accuracy, in conjunction with an independent means, under control of the control device, which constitutes the third factor for the 3-dimensional method of operation. Although this independent means, illustrated in Figs. 26 and 27, is solenoid-operated, it may be operated by an independent electric motor and a clutch mechanism or similar means, under constant control of the device.

The turbo-blades 400 having their root-end portion relatively massive and their opposite end quite thin, are supported during the milling operation in a fixture, Figs.

23, 24, and 26, comprising a head-stock 401 and a tail-stock 402, mutually connected by integral therewith ribbed bar 403. The head-stock and the tail-stock are each provided with a vertical bore 404 adapted for a limited sliding engagement with two posts 405 having shoulders 406 screwed into the rear extension 407 of the base plate 10 of the control device. In the hollowed center of each post 405 there is a rather strong coil spring 408 engaging at one end a cross-pin 409 disposed in the central upper portion of each bore 404, and at the lower end it is anchored to the inverted T piece 410, the lower wider portion of which is disposed in the groove 411 formed in the lowest portion of posts 405, as shown in Figs. 23 and 24. From this arrangement both the headstock and the tail-stock, under tension of said springs, are urged downwardly in contact with the shoulders 406 of posts 405. The head-stock 401 is provided with a horizontal bore to receive a bearing 412 in which a mandrel 413 is journaled. The inner end of the mandrel is secured to a chuck 414 provided with stops and gripping, not illustrated, jaws for holding the work being machined, in this case, four turbo-blade forgings 400. The special jaws and stops, not illustrated, gripping the massive root-end of the blades are locked in position by a conventional wrench inserted in the socket 415 of the chuck.

In order that the thin end of the blade may adequately be supported while being machined, it is provided with an appendage or lug 416 integral therewith, during the preceding forging of the blade operation, which eventually will be cut off, and it is counter-sunk for engagement with a center 417 having a reduced portion 418 and carried on a rotary disc 419 having its central portion countersunk and engaged by a center 420 forming part of the tail-stock assembly. The center 420 is provided with a knurled head 421 on its free end, for manual operation, and its main body is threaded for engagement with similarly threaded bearing 422 secured in the horizontal bore of the tail-stock 402 and having a flange 423 bearing against the inner side of the tail-stock. To hold the center 420 in the set position, it is slightly undercut on its periphery near its longitudinal center at 424 to receive the end of a knurl-headed screw 425 screwed on top of the tail-stock. As shown in Fig. 23, both the mandrel 413 and the center 420 are disposed on the same longitudinal axis while the fixture rests on shoulders 406 of posts 405.

As illustrated in Figs. 23, 24, and 26, both output shafts 19 and 20 are connected directly and at a close range to the work-supporting fixture, for structural reasons and to insure accuracy in the transmission of movements. The gearing connections are only illustrative and may be varied to suit each particular situation.

Referring to Figs. 24, 26 and 28, the output shaft 20 projecting outwardly from the plate 12 has a reduced portion 426 to receive a worm 427, which is firmly fastened thereto by a key 428 and a nut 429 on the threaded end of the shaft, pressing the worm against the shoulder formed by the reduced portion 426. The worm 427 is in meshing engagement with a worm wheel 430 having a hub 431 on one side which is secured by a pin 432 to a short transverse shaft 433 journaled in combination radial and thrust ball bearings 434 held in recesses provided in the upright portions 435 of two angle brackets 436 secured to the base extension 407 by screws 437. A worm 438 securely mounted on the end of shaft 433 by a key and a nut, not illustrated but similar to that of worm 427 on shaft 20 shown in the enlarged view in Fig. 28, is in mesh with a sector worm wheel 439 mounted on longitudinally disposed shaft 440 journaled in bearings 441 fastened to the base extension 407 by screws 442, the left side bearing 441 being integral with bracket 436. The sector worm wheel 439 is secured to the end of shaft 440 by its hub 443 and a pin 444. The shaft 440 carries also two sector spur gears 445, secured thereto by pins 446, and meshing with respective vertically disposed racks 447 integral with the head-stock 401 and tail-stock 402 portions of the fixture, respectively. Thus, both the head-stock and the tail-stock will raise in unison against the springs 408 when the shaft 20 is rotating in one direction, and when the direction of the latter is reversed, the fixture will slide down on posts 405 with said springs. The vertical movement of the fixture need not be great, and the arrangement of the racks 447, sector gears 445 and shaft 440 is to keep its position at all times in a true parallel relationship with the base during its up and down movements. In other words, the longitudinal axis passing through the mandrel 413 and the center 420 of the tail-stock will remain perfectly horizontal though the fixture may be constantly raised and lowered by the requirement of the work being machined.

Between the chuck 414 and the inner side of the head-stock there is a thrust ball bearing 448, and the outer end of the mandrel 413 carries a washer 449 and a worm wheel 450 secured to the reduced portion of the mandrel by a key 451 and a set screw 452. Meshing with the worm wheel 450 is a worm 453, see Fig. 24, slidably mounted on a vertically disposed shaft 454 held at each side of the worm 453 in bearings 455 integral with the head-stock portion of the fixture and also in a fixed bearing 456 secured by dowel pins 457 and a screw 458, see Fig. 26, to the base extension 407. The upper and the middle portion of the shaft 454 is provided with a key-groove 459 with which a key secured in the worm 453 (not illustrated) is adapted to cooperate for the vertical sliding movement and for mutual rotation with the shaft 454. To minimize the end-thrust of the worm 453, a washer 460 at each side thereof is provided. The lower end of the shaft 454 is provided with a head 461 and a washer 462 in contact with the lower side of the bearing 456, and above the latter there is a thrust ball bearing 463 and a helical gear 464 having a hub 465 secured to shaft 454 by a pin 466. Thus, the helical gear on one side and the head 461 on the other side of bearing 456 insure the shaft 454 against axial displacement while being free to revolve in either direction. The helical gear 464 is in mesh with another helical gear 467, of the same hand, secured by its hub portion 468 and a pin 469 to the projected end of the output shaft 19, see Figs. 23 and 24.

As can be seen in Figs. 23 and 24, the position of the fixture (resting on shoulders 406 of posts 405) and that of the gear-trains of both output shafts connected with the fixture are illustrated in their extreme lowest position, so that the relation of one to the other may be better understood. However, during a milling operation, the fixture will be raised by the shaft 20 well above the shoulders 406 to about one-half of its vertical sliding movement, in order that it may reciprocate there the relatively slight distance required without interference. During the vertical up-and-down movement of the fixture by the shaft 20, or during dwelling periods of the latter and consequently of the fixture, the independent shaft 19 may rotate the mandrel and the chuck 414 in either direction. When the fixture is being moved upwardly or downwardly, the bearings 455 will carry the worm 453 along accordingly, without interference with the movement being transmitted at the time to the vertical shaft 454 by shaft 19.

The chuck 414 and the disc 419 carry the four turbo-blades 400 equally spaced apart, for the external milling operation. For internal milling of the blades, a different fixture, not illustrated, will be required. Instead of the appendages 416 and centers 417 engaging them, the appendages may be made the width of the blades and the disc 419 provided with stops for the thin end of blades' concave side to rest, and suitable clamping means above the appendages.

As illustrated in Figs. 23, 24, 26 and 27, the automatic control device together with the attached fixture supporting the work being machined are securely clamped on the table 470 of a conventional vertical milling machine by suitable screws 471 (a few of which are illustrated), under a milling machine cutter 472 firmly held in a spindle 473. The milling machine spindle may be rotated by an independent power source at the required speed.

Accurate and convenient alignment of the control device and the fixture with the table 470 of the milling machine is effected by means of the heads 16 of screws 15 projecting downwardly from the base 10 into T slots 474 usually provided on milling machine tables, as shown in Figs. 3 and 4. In accordance with the usual practice, the device and the fixture may be adequately protected against dust, flying chips and accidental interference, by suitable gear-guards and covers which, for the sake of simplicity, have not been shown.

One type of independent movement, controlled by the record tape, is illustrated in Figs. 26 and 27. Actuated by a solenoid at irregular intervals under constant control of the record, it is suitable by its simplicity and dependability for the milling operation of the blades 400, but in other cases this independent movement may be arranged to operate either at regular intervals or rotated continuously, partly in one and partly in the reverse direction, as required in each particular case. As above stated, this independent movement may be actuated by a separate electric motor, especially when continuous rotation of considerable power is required.

The record-controlled solenoid operated mechanism will now be described. Its function in the milling of the blades 400 is to introduce the third factor required for the 3-dimensional operation, the two output shafts being the other two factors. It is obvious that the three mentioned factors may change functions between themselves whenever conditions warrant it, in cases, for instance, where no fixtures are required as in the production of profiles held in a vise or clamped directly on the table of the milling machine, as would be the case in the production of dies and molds.

A conventional feed-screw end 500 of a milling machine table 470 is illustrated in Figs. 26 and 27, by which the table is moved longitudinally in either direction, under the stationary rotary spindle 473 carrying a milling cutter 472. A ratchet wheel 501 provided with a hub 502 on one side and with a hub 503 on the other side is secured by a pin 504 to the feed-screw 500 at a point of reduced diameter, close to the rear end of the table 470. The hub 503 carriers a swinging member 505 one end of which is pivotally connected by a shouldered stud 506 to a pawl 507 adapted for engagement with the ratchet wheel 501, by a coil spring 508 engaging fixed pins 509 projecting laterally from the pawl 507 and the swinging member 505, respectively. The lower end of the latter is pivotally connected by a shouldered stud 510 to a link 511 provided with an eye on one end 512 for engagement with one end of a coil spring 513 having its other end anchored at a pin 514 fixed at the rear end of the table 470. The opposite end of the link is pivotally connected by a pin 515, between bifurcated sides 516 to the core 517 of the solenoid 518 secured to the rear end of the table 470 by a rear plate 519 and screws 520. Cooperating with the ratchet wheel 501 is a lever 521 pivoted at a shouldered stud 522 screwed to the table 470 and carrying at its upper end a laterally projecting fixed pin or stud 523 and a roller 524 engaging the teeth of the ratchet wheel. A coil spring 525 attached to pins 526 fixed to the lever 521 and table, respectively, keeps the roller 524 in constant contact with the ratchet wheel. A stop-pin 527, above the roller 524, fixed to the table 470, serves to locate the swinging member 505 and its pawl 507 a little beyond the ratchet tooth, to insure proper engagement therewith. A manually operated handle 528, shown in Fig. 26, is secured to the end of the feed-screw 500 by a key, not illustrated, and a nut 529.

Referring to Figs. 23 and 25, the back of the chuck 414 is provided with a laterally projecting fixed pin 530 carrying a roller 531, which is adapted to cooperate with the leaf actuator 532 forming part of a standard type microswitch 533 secured by mounting holes provided in the switch and by screws 534 and nuts 535, see Fig. 26, to the vertical portion 536 of a bracket 537 screwed below the ribbed bar 403 of the fixture by screws 538. Thus during rotation of the chuck 414 the roller 531 upon reaching the lower perpendicular line passing through the mandrel 413, will depress the actuator 532 and plunger 539 of the switch. The micro-switch is arranged to close the circuit for the solenoid 518 so that when the plunger 539 is depressed the solenoid 518 is energized. When the solenoid is energized, the core 517 is pulled to the left in Fig. 27 against the spring 513 to effect a feeding movement of the feed-screw 500 and hence of the table 470 a distance equivalent to one ratchet tooth or two teeth, as predetermined by the pulling stroke of the solenoid. Upon continued rotation of the chuck 414, the solenoid will be deenergized and the spring 513 will restore the position of parts to that illustrated in Fig. 27. The resulting effect of the solenoid-produced action, is the advance of the table 470 carrying both the control device and the fixture a predetermined distance relative to the rotating cutter 472 which remains stationary.

The milling operation of turbo-blades 400 is substantially as follows: The most suitable speed of the power shaft 28, spindle 473 and the feed of the table 470 by the solenoid must first be adjusted in relation to the material of which the blade forgings are made, the type of the cutter used and whether for roughing or finishing operation. Most vertical milling machines are provided with means for raising and lowering of both the knee of the table and of the spindle assembly, and also with means for the cross-feed of the table relative the spindle, after which these means can be secured in the set positions. Once the central position of the spindle 473 to that of the fixture has been accurately set, as illustrated in Fig. 24, the cross-feed of the milling machine would be locked to maintain this position. Assuming that the feed of the solenoid and table 470 is from right to left in Fig. 23, the milling cutter 472, as shown, is in the longitudinal starting position.

As before stated, the fixture will be raised by the shaft 20 from the position illustrated in Fig. 23 to about its middle vertical travel, and the knee of the milling machine adjusted relative the cutter 472 and locked to prevent vibration and undue movement. From the foregoing it was seen that the fixture supporting the four blades 400 is capable of three movements independent one from the others: I. Rotation of the chuck 414 in either direction a varying amount with dwell periods, by shaft 19; II. Raising and lowering of the fixture toward or away from the revolving cutter 472 with dwell periods, by shaft 20; and III. Longitudinal movement of the table, carrying both the control device and the fixture, in one direction a predetermined amount, e. g. two ratchet teeth for roughing and one tooth for finishing operation, all three movements being coordinated and under constant control of the record tape. The record tape may be produced by any suitable means such as by a special semi-automatic device of great precision and at a rapid rate, from figures obtained from blueprints, is not here described because it is the subject of a separate patent application. The tape which may be of thin gauge steel or other suitable metal may also be prepared by cutting with hand tools the simple steps on the edges of the tape to produce the complex movements described. In view of the fact that the movements of both output shafts are controlled by both edges of the record tape simultaneously, their movements therefore can be depended upon to be at all times coordinated. Likewise, the solenoid-actuated movement, is operated at irregular periods by the control of one of the output shafts.

As before stated, the blades 400 have concentric portions, but this concentricity is not with the axis of the mandrel carrying the chuck supporting the blades. However, this is of no importance whatsoever, as this portion will be attended to in the same way as the other portions, tangent or otherwise, by appropriate movements of the output shafts and of the solenoid. In order that the contour of the blades be in accordance with the blueprints and have a uniformly smooth surface, they must be guided under the cutter 472 in a path similar to that used in obtaining dimension figures from blueprints, and proffer slightly overlapping portions to the action of the milling cutter, so that the entire area of the blade be uniformly milled. Although the rotation of the chuck 414 may be intermittent and reversible, as before stated, but because the outer surface of the blade is not jagged and without shoulder-like protuberances, but blending gradually into a curvature, it may rotate most of the time at a predetermined uniform speed, e. g. two feed-units per cycle of shaft 28 for roughing and one feed-unit for finishing operation, respectively, by the output shaft 19. To accomplish this continuous movement in one direction of the chuck 414, without dwell periods, when the contour of the blades permits, the left edge of the record (looking in the direction of its travel, as indicated by an arrow) will be as illustrated in Fig. 15, without any slopes S and steps cut into it, simply having its outer edge of a record tape blank, which at every revolution of the shaft 28 will cause the output shaft 19 to be advanced in the clockwise direction a distance equivalent to two ratchet teeth of the motion-translating mechanism. See annotations in Fig. 16. The direction of movement of the chuck 414 may or may not be the same as that of shaft 19, as desired in each case, by changing the hand of the helical or worm gears of the connection between the two.

Assuming that the chuck 414, controlled by the left outer edge of the record, or X–2 step, Fig. 15, has made one complete revolution with blades 400 in contact with the revolving milling cutter 472, Fig. 23. The result would be a cut concentric with the axis of the mandrel 413 around four blades. The latter contour, however, is not of that shape but of a curvature gradually approaching or receding from said axis. Thus, in order that the blade may be profiled to the contour other than that produced by the rotation of the chuck alone, a complementary movement is introduced by the vertical displacement of the fixture, by the shaft 20 controlled by the right edge of the record and in unison with the rotary movement of the chuck. This complementary movement of shaft 20 is effective in bringing the axis of the mandrel 413 closer to or farther from the revolving milling cutter which remains vertically fixed, depending in which direction it is moving. Every time the shaft 19 is rotated two feed-units or one feed-unit, the shaft 20 may also rotate two or one feed-unit in either direction or dwell. Blades 400 have no abrupt changes on their surface, but in the production of dies, for instance, where shoulders or projections are present, one output shaft may dwell when a shoulder is reached by the milling cutter, while the other output shaft will continue rotating the necessary feed-units until the cutter has cleared the shoulder. When working on dies, the latter may be held directly on the table of the milling machine and different connections may be used between the output shafts and the milling machine moving mechanism.

From the foregoing, it will be understood that the chuck 414 carrying four blades for simultaneous operation, may rotate differently from one revolution to another depending on the requirement of the profile being machined, this difference consisting in rotation of some portions at one feed-unit pace and other portions at two feed-units pace per cycle between dwells of varying extent, or no-dwell when it is not required, but every time the chuck completes a revolution, the pin 530 attached to the chuck will operate the microswitch 533 causing the solenoid 518 to be energized and resulting in a longitudinal movement of the table 470, which will proffer a new portion of the blades, adjacent to that just milled but slightly overlapped to prevent burrs, to the cutting action of the cutter at the following rotation of the chuck. The rotation of the chuck, in unison with the complementary vertical movement of the fixture, and the intermittent movement of the table will continue until the entire outer surfaces of four blades have been gone over by the milling cutter. The disposition of the pin 530 on the chuck may be such that the solenoid-operated movement of the table will occur when the milling cutter is in the space between blades, as in Fig. 23.

The most suitable ratio between movements of shaft 19 and the chuck would be for the latter, at the blade's contact with the milling cutter, to advance $\frac{1}{32}$" and $\frac{1}{16}$" when the shaft 19 rotates one feed-unit and two feed-units, respectively. And that of the fixture relative the shaft 20, the former should advance .0005" and .001" when the latter rotates one feed-unit and two feed-units, respectively. This ratio is obtainable with the gearing illustrated in Figs. 23, 24 and 26 and it is adaptable for easy changes whenever required in a well known manner, among which is the substitution of worms of different pitch and of different threads, single thread, double, for example. By having the control device and the fixture connected directly at close range, as illustrated, accuracy of movement transmission is thereby assured.

In the production of machine components of intricate shape, dies and molds, held in a vise or clamped directly on the table of the milling machine, as before stated, different connections would be needed between the output shafts and the solenoid, on one hand, and the moving mechanism of the milling machine, on the other. In certain cases, for instances, one output shaft might be connected to the knee, but preferably to the vertical ram carrying the revolving spindle, because the latter is much lighter in weight, is more accessible for structural reasons and much less subject to backlash than the former, for control of the perpendicular movement. In that case, the knee, after the initial setting, will be locked to prevent undue movement and vibration. The second output shaft will then be connected by suitable gearing to the longitudinal feed-screw of the table, and the solenoid also by suitable means to the cross-feed screw of the table, for movement in one or both directions, as required in each case. From this arrangement, a great variety of work will become feasible by the 3-dimensional operation. The second output shaft, instead of being connected to the longitudinal feed-screw may be connected to the cross-feed screw, then the solenoid connection will be substantially as illustrated in Figs. 26 and 27, or altered for movement in both directions. The microswitch, operating the solenoid, may, also, be located at any suitable point for engagement either by the ram, longitudinal or cross-feed movement of the machine, as required for each particular work.

It will be evident that the automatic control device is convenient and readily applicable for use in many manufacturing plants for a large variety of work. When applied to a conventional vertical milling machine, converting it in effect into a profiling machine, for 3-dimensional operation, work usually performed by master-tracer method, can be automatically, more rapidly and at a lower cost be produced on such a converted machine.

It should be evident from the foregoing that the minute movements, of the simplest kind, generated by the record tape, and transferred to stop-members to be engaged by the elements of the motion-translating mechanism for translation into corresponding clockwise and counter-clockwise direction of movement, so the movements are transferred in terms of a single or a double feed-unit, or no movement at all, in a continuous or intermittent movement, subsequently amplified by the power shaft, without distortion, independently from the record, into positive movements of considerable power, to two output shafts independent of each other for final independent or mutual effect, is susceptible of practically unlimited movement combinations. The described automatic control device of this invention is applicable to numerous machines in varied fields requiring protracted movements of great complexity and accuracy, at a slow or high speed.

It will be appreciated that in the foregoing description, the applicant has particularly detailed a preferred embodiment of the invention for accomplishing the novel results of the invention. For completeness of disclosure, the description has been specific in every detail. However, it will be appreciated that the invention may be carried out in various other ways and means. Therefore, it should be understood that the invention is not limited to the specific structure herein shown and described but may be embodied in other forms without departing from the scope of the invention as defined in the following claims.

What is claimed is:

1. An automatic control device, comprising a record tape having registry of movements formed in at least one edge thereof, at least one output member, motion-translating means mounted on said output member having an operative and an inoperative position, a movement-transfer means cooperating with said edge of the record tape provided with means for setting the motion-translating means in said operative and inoperative positions in accordance with the record tape, a power shaft, and means actuated by the power shaft, including torque-amplifying means adapted for engagement with said motion-translating means when in said operative position, for operating the output member.

2. An automatic control device, comprising a movable record tape having movements recorded in at least one edge thereof in the form of a series of parallel control steps of varying length and slopes joining the ends of adjacent control steps, at least one output shaft carrying motion-translating means, a movement-transfer means in constant resilient contact with said control edge of the record tape and including means for setting said motion-translating means in various operative positions; a power shaft, and torque-amplifying means connected to the power shaft and engageable with said motion-translating means, for rotating the output shaft in accordance with said settings.

3. An automatic control device, comprising at least one output member which may dwell and which is rotatable in both directions, a record tape having control portions in at least one of its edges effective in controlling said rotation and said dwell of the output member, motion-translating means on the output member having an inoperative and two operative positions, means between the control edge of the record tape and the motion-translating means for setting the latter in said inoperative and operative positions in accordance with said control portions on the tape, and torque-amplifying means engageable with said motion-translating means when in one of said two operative positions, whereby the output member is moved by the power-amplifying means independently from the record tape but in accordance therewith.

4. An automatic control device for machines, comprising a record tape provided with registry of movements in at least one edge thereof, at least one output shaft, a motion-translating mechanism mounted on said output shaft, said mechanism including two members each provided with a setting lug and an operating abutment, a spring engaging both members; a torque-amplifying mechanism, including an operating pin, adapted for oscillating movement along a predetermined path and for engagement with said abutments when positioned in the path of the movement of the pin; a record-actuated mechanism provided with stops for setting said setting lugs in various positions, whereby said abutments will selectively be positioned in the path of the operating pin while the latter is moving in one direction of its oscillating movement to be engaged by said pin on its return movement; means between the motion-translating mechanism and the output shaft whereby partial rotation of the output shaft is effected by said engagement of the abutment and the operating pin, and the direction of rotation of the output shaft corresponding to the direction of movement of the pin during which such engagement was effected; a power shaft, and means connected to the power shaft for advancing the record tape and other means connected to the power shaft for operating said torque-amplifying mechanism.

5. An automatic movement control device for machines, comprising a record in the form of a tape having movements registered in its edges in the form of longitudinally disposed parallel steps of varying length, a power shaft, means actuated by the power shaft for driving the record, two output shafts, means on said output shafts controlled by the record for regulating the direction of rotation and dwell of said output shafts, and additional means on said output shafts actuated by the power shaft for rotating the output shafts by engagement with the said controlled means.

6. An automatic movement control device for machines, comprising a record element in the form of a tape having a plurality of step-like control portions formed in its two edges, said control portions being parallel to each other and each being of a predetermined length correlative to movements to be produced by the control device and disposed along and at a predetermined distance from the longitudinal axis of said tape, said longitudinal axis being at the center of the blank tape, a power shaft, means actuated by the power shaft for driving the record tape, two output shafts independent of each other, means on said output shafts controlled by the record tape for regulating the direction of movement and dwell of said output shafts, and additional means on said shafts actuated by the power shaft for rotating the output shafts by engagement with the said controlled means.

7. An automatic movement control device for machines, comprising a movable record in the form of a tape having movements registered in its two edges, said registered movements being in the form of a plurality of step-like outlines, all steps being of lengths corresponding to movements to be reproduced by the control device, and having a fixed distance-relationship with regard to the longitudinal axis of the tape in the blank form, a power shaft, means actuated by the power shaft for intermittently driving the record, two output shafts adapted for movement independent of each other, a motion-translating mechanism on each of said output shafts controlled by the record, a torque-amplifying mechanism on each of said output shafts engageable with the motion-translating mechanism, said torque-amplifying mechanisms being actuated by means connected to the power shaft for rotating the output shafts in either direction in accordance with the movements registered on the record tape.

8. An automatic device for control of machines, comprising a power shaft, two output shafts, adapted for dwell and for rotation in both directions, independently of each other, an integrated motion-translating and torque-amplifying mechanism on each output shaft provided with engageable means for intermittent mutual operative engagement; a movable record tape having control portions in the form of a series of steps in each edge, said steps being of varying length and paralleling the direction of movement of the tape, each control step of the series having a definite predetermined position on the tape transversely thereof, the ends of adjacent steps being joined by slopes; a record-actuated movement-transfer mechanism including means for positioning said engageable means for said mutual operative engagement, whereby certain control steps of the record tape are effective for controlling rotation of the output shafts in one direction, other control steps of the record tape are effective for controlling rotation of the output shafts in the opposite direction, and still other control steps of the record tape are effective for controlling dwell periods of the output shafts, the extent of continuous rotation of the output shafts in a selected direction and the extent of uninterrupted dwell periods of said shafts depending on the length of the corresponding control steps of the record tape; and means connected to the power shaft and to the torque amplifying mechanisms for operating the latter for rotating the output shafts, by engagement with said motion-translating mechanisms, independently from the record tape and in accordance therewith.

9. An automatic movement control device for machines, comprising a power shaft, two output shafts adapted for dwell and for rotation in either direction to the extent of one feed-unit and two feed-units selectively per operative cycle of the power shaft, a record tape having control steps formed in its edges for controlling said dwell and said rotation of the output shafts, means between the record and the output shafts including members adapted to be set selectively in operative and inoperative positions by the control steps, and means actuated by the power shaft for engaging the members set in operative position for rotating the output shafts in accordance with the record tape.

10. An automatic movement control device for machines, comprising a power shaft, two output shafts each adapted for dwell and for rotation in either direction to the extent of one feed-unit and two feed-units selectively per operative cycle of the power shaft, said rotation capable of being sustained in one direction for any aggregate of cycles; a record tape having a plurality of longitudinally disposed control steps of varying length formed in its edges for controlling said dwell and said rotation of the output shafts, the length of each control step longitudinally of the record determining the aggregate number of cycles during which rotation in one direction of each output shaft is sustained, the relative position of each control step on the record tape transversely thereof determining the direction of rotation and dwell of each output shaft; means between the record tape and the output shafts for controlling said rotation and dwell including elements adapted to be set alternatively in an operative and in an inoperative position by said steps, and means actuated by the power shaft for engaging the elements set in operative position for rotating the output shafts in accordance with the record tape.

11. An automatic movement control device for machines, comprising a movable record tape provided with a plurality of longitudinally extending control steps of varying length and disposed at various positions transversely of the record tape including a "Zero" step at each side of said tape, each step having a predetermined position on the record tape relative to the other steps transversely of the tape and corresponding to a predetermined movement, adjacent steps being connected by slopes, a power shaft, two output shafts adapted for rotation in either direction and for dwell, a dual motion-translating mechanism secured on each output shaft, a dual torque-amplifying mechanism loosely mounted on each output shaft adapted for engagement with its respective motion-translating mechanism, dual movement-transfer means actuated by the record tape provided with means controlling the direction, the extent of rotation in the selected direction and the extent of dwells of each output shaft in accordance with the control steps on the record tape by engagement with said motion-translating mechanisms, all steps, except a Zero step at each side of the record, being effective for controlling the dual movement-transfer means whereby each motion-translating mechanism is operatively positioned for engagement by its companion torque-amplifying mechanism for rotating the shaft upon which it is mounted, the position of each motion-translating mechanism, assumed at the start of each control step, continuing unchanged until the step is superseded by another control step which establishes a new control, after adjustment by action of the connecting slope on the movement-transfer mechanism, so that rotation of the respective output shaft will continue unchanged in the direction of movement initiated by said control step, and means connected to the power shaft for advancing the record tape and for operating the torque-amplifying mechanisms.

12. An automatic device for controlling movements of machines, comprising a record tape having a plurality of longitudinally extending control steps of varying length, a Zero step, an inner and an outer step in respect to the Zero step, at each side of the record tape, all Zero, inner and outer control steps having fixed relative positions on the record tape transversely thereof, the ends of adjacent steps being joined by slopes; two output shafts each carrying integrated motion-translating and torque-amplifying mechanisms; a movement-transfer mechanism comprising two pivoted levers each carrying a roller adapted for operative engagement with an edge of the record tape, and two bars connected to the levers and paralleling said output shafts provided with stop members each formed with two stops at each side thereof, springs for the movement-transfer mechanism assuring constant operative contact of said rollers with the edges of the record tape; setting lugs on said motion-translating mechanisms settable by said stops selectively in operative and in inoperative position; the position-relationship of said stops on the bars to the setting lugs being in accordance with the control step of said inner, outer and Zero control steps which is at the time in engagement with each of said rollers on both sides of the record tape; a power shaft, means actuated by the power shaft for advancing the record tape and through the latter the movement-transfer mechanism, and for operating said torque-amplifying mechanisms for rotating the output shafts in accordance with the settings of the motion-translating mechanisms.

13. In an automatic control device for machines, a record element in the form of a tape having movements recorded in its edges in the form of a plurality of longitudinally extending control steps of varying length, three control steps, including a Zero step, at each side of the record tape, each control step having a fixed lateral position on the record tape relative the longitudinal axis of the tape in blank form, the ends of adjacent control steps being connected by slopes; a movement-transfer mechanism comprising a pair of levers each carrying a roller for operative engagement with an edge of the record tape and two bars connected to said levers, each bar being provided with a series of stops, resilient means on said movement-transfer mechanism insuring constant operative contact of said rollers with the edges of the record tape; integrated motion-translating and torque-amplifying mechanisms having an inoperative and two different operative positions relative to each other, lugs on said integrated mechanisms engageable with said stops whereby such inoperative and operative positions are regulated, said stops being relatively staggered on said bars whereby a Zero step of the record tape, when in operative engagement with a roller at one side of the record tape, the respective motion-translating mechanism will be set in inoperative position by said stops and so that it is not engageable by the integrated torque-amplifying mechanism, when a second control step is in operative engagement with a roller at the same side of the record tape, the respective motion-translating mechanism will be set in one operative position so that it is engageable by the integrated torque-amplifying mechanism for movement in one direction; when the third control step is in operative position with the roller at the same side of the record tape, the respective motion-translating mechanism will be set in the second operative position so that it is engageable by the integrated torque-amplifying mechanism for movement in the opposite direction, a power shaft, means actuated by the power shaft for operating said integrated mechanisms, and means for advancing the record tape for resetting the motion-translating mechanisms by the action of the slopes of the record tape on rollers of the movement-transfer mechanism.

14. In an automatic control device for machines, a record element in the form of a tape having registry of movements in its two edges in the form of a plurality of longitudinally extending control steps of varying length including three control steps parallel to each other, of which one is a Zero step, at each side of the record tape, each control step having a fixed transverse position relative other steps on the same side of the tape, the ends of adjacent control steps being joined by slopes; a movement-transfer mechanism including two pivoted levers each carrying a roller for operative engagement with an edge of the record tape, springs on said mechanism enabling constant contact between said rollers and the edges of the tape; a power shaft, means actuated by the power shaft for advancing the record tape, whereby said control steps including Zero steps of the record tape having an inactive effect on said movement-transfer mechanism during the movement of the record tape, and said slopes on the record tape, during the movement thereof, having a shifting action on said movement-transfer mechanism.

15. An automatic movement control device for machines, comprising a movable record tape having registry of movements in its edges in the form of a plurality of longitudinally extending parallel steps of varying length, each control step having a fixed transverse position on the tape and each step corresponding to a predetermined movement to be produced by the control device, adjacent control steps being joined by slopes, one of said control steps at each side of the record tape being a Zero step; a power shaft, two output shafts adapted for rotation in either direction and for dwell, dual integrated motion-translating and torque-amplifying mechanisms on each of said output shafts, mutually-engageable means provided on each mechanism, a dual movement-transfer mechanism actuated by the record and having a plurality of stops for setting the corresponding motion-translating mechanism in inoperative position with respect to its companion torque-amplifying mechanism for preventing engagement of their mutually-engageable means resulting in a dwell of the output shaft on which the mechanism is mounted, when the movement-transfer mechanism is in operative engagement with a Zero step; and for setting the corresponding motion-translating mechanism in operative position in respect to its companion torque-amplifying mechanism to allow the latter to engage the former, resulting in rotation of the output shaft on which it is mounted, when the movement-transfer mechanism is in operative engagement with a control step other than Zero step, the amplitude of the dwell and of sustained rotation of each output shaft in one direction depending on the length of the control step in contact with said movement-transfer mechanism.

16. An automatic device for controlling movements of machines, comprising a record tape having control portions recorded in its edges in the form of a series of parallel steps of varying length, each control step having a definite lateral position and lateral space-relationship with respect to other steps at each side of the tape, slopes connecting the ends of adjacent control steps; a power shaft, two output shafts each carrying a combined motion-translating and torque-amplifying mechanism adapted for mutual intermittent engagement, means connecting the power shaft with the torque-amplifying mechanisms for rotating the output shafts when the torque-amplifying mechanisms are in engagement with the motion-translating mechanisms; a movement-transfer mechanism comprising rollers for operative engagement with control edges of the record tape, and two bars each carrying a series of stops for operative engagement with said motion-translating mechanisms for setting the latter in position to be engageable by the corresponding torque-amplifying mechanism for amplification by the power shaft of movements received from the record tape and for transmission to the respective output shafts; means actuated by the power shaft for advancing the record tape a predetermined extent per operative cycle of the power shaft, the longitudinal extent of said slopes being less than the extent of advance-movement of the record tape per operative cycle of the power shaft whereby said rollers, at the beginning and upon completion of said operative cycle, rest on parallel control portions on the edges of the record tape.

17. An automatic control device for machines, comprising a power shaft, two output shafts each adapted for rotation independently from the other selectively in either direction and also selectively in one and two feed-units per operative cycle of the power shaft; means for controlling said rotation of the output shafts including a record, structurally in the form of a relatively thin and narrow tape, said record tape having movements recorded in its edges in the form of a plurality of longitudinally extending control steps of varying length, the ends of control steps being connected by slopes, each control step having a fixed lateral position relative other steps on the same side of the record tape; controlled means between the record tape and the output shafts, the record tape operating said controlled means exclusively for control and by a relatively low exertion of power, and means between the power shaft and the output shafts for operating the latter with relatively considerable application of power by application of power to the controlled means whereby the output shafts are operated in consonance with the movements recorded on the record tape.

18. In an automatic control device for machines, two output shafts, a motion-translating mechanism on each of said shafts, each motion-translating mechanism comprising a right-hand and a left-hand member forming a pair, each member being provided with a lug, a spring having ends attached to each of said members of a pair whereby said lugs are urged toward each other, a movable record tape, and a record-actuated movement-transfer mechanism provided with a series of stops for alternative engagement with said lugs against said springs, for setting the latter selectively in operative and in inoperative positions.

19. In an automatic control device for machines, two output shafts each carrying a motion-translating mechanism comprising a right-hand and a left-hand member forming a pair, each member being provided with a lug, a spring having its ends attached to each of said members of a pair whereby said lugs are urged toward each other; a power shaft having an operative cycle of movement, a record tape, means for advancing the record tape, a record-actuated movement-transfer mechanism provided with a series of stops for alternative operative engagement with said lugs for setting the latter in operative and in inoperative position, and means on the record tape, including parallel control steps of varying length, for maintaining unchangeable the setting of said lugs effected during the immediately preceding cycle of the power shaft, and including also slopes on the edges of the record tape, effective for resetting of said lugs assumed during the immediately preceding cycle.

20. In an automatic control device for machines, a record element in the form of a tape having movements recorded in its edges in the form of a plurality of longitudinally disposed parallel steps of varying length, each control step having a definite position on the record tape laterally thereof, the ends of adjacent control steps being joined by slopes; output shafts, integrated motion-translating and torque-amplifying mechanisms on said shafts, each mechanism having an inoperative and a plurality of operative positions relative each other, a record-actuated movement-transfer mechanism provided with two pivoted levers each carrying a roller for operative engagement with an edge of the record tape and with staggered stops for setting the motion-translating mechanisms in the said operative positions, whereby they are made engageable by the integrated torque-amplying mechanisms, resilient means for said movement-transfer mechanism for maintaining constant operative contact with the record tape, a power shaft, and means actuated by the power shaft for advancing the record tape, and through said slopes on the record tape for shifting the movement-transfer mechanism against or with said resilient means, whereby resetting of said motion-translating mechanisms is effected.

21. An automatic movement control device for machines, comprising a power shaft, a record tape having movements recorded in its edges in step-like outlines of varying length and disposed longitudinally thereof, each control step having a definite lateral position on the record tape, adjacent control steps being joined by slopes; two output shafts, independent of each other, and being adapted for dwell and also for rotation in either direction at a predetermined rate of a single and of a double speed selectively per operative cycle of the power shaft, independently of the speed of the power shaft, integrated motion-translating and torque-amplifying mechanisms on each of said output shafts including an auxiliary mechanism cooperating with the motion-translating mechanisms, a movement-transfer mechanism cooperating with the record tape and with said motion-translating mechanisms, the control steps and slopes of the record tape controlling said dwell and said rotation of the output shafts; means connected to the power shaft for operating the auxiliary mechanism, other means connected to the power shaft for feeding the record tape, and through the record tape, for operating the movement-transfer mechanism, and still other means actuated by the power shaft for operating said integrated mechanisms and through the latter for rotating the output shafts in accordance with the control exerted thereon by the record tape.

22. An automatic device for controlling movements of machines, comprising a record tape provided with registry of movements in its edges in the form of parallel steps of varying length and slopes joining adjacent control steps; a power shaft, two output shafts for rotation independent of each other in either direction and for dwell each carrying a group of mechanisms, each group comprising a motion-translating mechanism secured on its shaft and a torque-amplifying mechanism loosely mounted thereon, said mechanisms being provided with mutually engageable means, driving means between the power shaft and said torque-amplifying mechanisms for continuously oscillating the latter and for rotating the output shafts when the mutually-engageable means are in engagement, setting lugs on each of said motion-translating mechanisms forming a part of the engageable means, settable in various operative positions for setting the engageable means, whereby the direction of rotation of each output shaft is determined and the speed thereof in the extent of a single and of a double rate per operative cycle of the power shaft is likewise determined, said single and double rate of speed being independent of the speed of rotation of the power shaft; a movement-transfer mechanism comprising two pivoted levers each carrying a roller for resilient constant engagement with said registry of movements on each edge of the record tape, and two bars one of which being connected to each of said levers, each bar being shiftable along each of said output shafts independent of the other bar and provided with a series of stops at each side thereof adapted for operative engagement with said setting lugs for setting same in said various operative positions, whereby the direction of rotation and said two selective speeds of each output shaft is controlled by said control steps and said slopes on the edges of the record tape, and means actuated by the power shaft for advancing the record tape and for shifting the movement-transfer mechanism selectively in either direction by the action of slopes of the record tape on rollers cooperating therewith.

23. An automatic control device for machines having a movement-transfer mechanism, a record tape for actuating and controlling movements of said movement-transfer mechanism, the record tape having a plurality of longitudinally extending control steps of varying length in its edges, each step disposed at a fixed distance from the longitudinal axis of the tape in blank form, ends of adjacent control steps being connected by slopes; a power shaft, two output shafts carrying means controlled by said record tape through said movement-transfer mechanism, and torque-amplifying means, engageable with the controlled means on said output shafts, the torque-amplifying means being operable by the power shaft for rotating the output shafts in consonance with said controlled means; means for moving the record tape and through the latter the movement-transfer mechanism; the movement-transfer mechanism comprising two levers each carrying a roller for constant engagement with an edge of the record tape, springs to make this engagement resilient, two bars one connected to each of said levers for movement independent of each other and parallel to the output shafts, said bars carrying stop members each provided with relatively staggered stops at each side of stop members, one of said stops at each side of each stop member being wider than other stops on the same side thereof, fastening means between stop members and said bars; the position of stops on said bars having definite relation to positions the control steps occupy on the record tape laterally thereof, said rollers and stops of the movement-transfer mechanism being effective in transmitting control movements from the record tape to the controlled means on the output shafts.

24. An automatic movement control device for machines having a movable record tape and a record-actuated movement-transfer mechanism associated therewith, said record tape being provided with longitudinally extending control steps of varying length and slopes connecting the ends of adjacent steps, the latter having predetermined fixed positions on the record tape at right angles to the movement of the tape, the length of each control step, its lateral position on the tape and said connecting slopes constituting the registry of movements in the edges of the record tape; said movement-transfer mechanism comprising two pivoted levers each carrying a roller for operative engagement with the steps and slopes of the tape, springs to make this engagement resilient and two bars adapted for longitudinal movement, each carrying a plurality of setting stops at each side thereof, connections between the bars and the levers; a power shaft, and means actuated by the power shaft for advancing the record tape, whereby the slopes on the record tape act on said rollers for shifting each bar independently from the other bar selectively in one direction, against its spring, and in the opposite direction, with its spring, and output shafts controlled by shifting of said bars.

25. An automatic control device for machines having a movement-transfer mechanism and motion-translating mechanisms associated therewith, two output shafts, at least one motion-translating mechanism on each output shafts, at least one motion-translating mechanism on each output shaft, each motion-translating mechanism forming a unit comprising a right-hand and a left-hand member, each member having a lug adapted to be set in operative and in inoperative positions, a spring common to both of said members of a unit urging their depending lugs in the direction of each other; a power shaft, means for operating the movement-transfer mechanism including a record tape moved by the power shaft and springs, said movement-transfer mechanism serving for transmission of movements engendered by said record tape to said motion-translating mechanisms, for setting the latter selectively in operative and in inoperative positions, the movement-transfer mechanism comprises two pivoted levers each carrying a roller for constant resilient engagement with the record tape at each side thereof, and two bars having connections with said levers, each bar, adapted for rectilineal movement independent of each other, carrying two stop members each provided with relatively staggered stops at each side of said stop members and engageable by said lugs for operative positioning thereof.

26. An automatic movement control device for machines, comprising a record tape having control components in its edges, a power shaft, means connected to the power shaft for moving the record tape, a frame, two output shafts independent one from the other and each carrying an integrated motion-translating and torque-amplifying mechanism adapted for mutual intermittent engagement, setting means on each motion-translating mechanism settable in operative and in inoperative positions, means actuated by the power shaft for operating the torque-amplifying mechanisms for driving the output shafts by engagement with the motion-translating mechanisms when the latter are in said operative positions, a movement-transfer mechanism comprising two pivoted levers each having a roller for constant operative engagement with one side of the record tape and two bars each carrying a series of stops at each side thereof adapted for selective operative engagement with the setting means for setting the motion-translating mechanisms in said operative and inoperative positions, fixed stops on the frame for engagement by said levers, springs on the movement-transfer mechanism urging said levers to be normally in contact with said stops on the frame, whereby stops on said bars are in a position causing the motion-translating mechanisms to be constantly in operative position and thereby engageable by the torque-amplifying mechanisms for rotation in one direction of both output shafts; and said control components of the record tape being effective, during advance of the record tape, for altering said normal settings of the motion-translating mechanisms, against the springs on the movement-transfer mechanisms, whereby said unidirectional rotation of both output shafts may be changed.

27. An automatic movement control device for machines having a movemen-transfer mechanism, means for actuating the movement-transfer mechanism including a power shaft, a record tape and springs; two output shafts, motion-translating units mounted on the output shafts adapted to be set in inoperative position and in two operative positions by said movement-transfer mechanism in accordance with the record tape; said movement-transfer mechanism comprising two pivoted levers and two bars connected therewith, a roller on each lever for constant resilient contact with one edge of the record tape by one of said springs; a frame, fixed stops on the frame for limiting movement of said levers toward the edges of the record tape by said springs; guides on the frame for said bars, each bar being adapted for a limited reciprocating movement, independently of each other, in the guides fixed to the frame, said bars carrying stop members fixed thereto, each being provided with stops relatively staggered at each side of each bar, said stops being adapted for setting said motion-translating units selectively in said operative and inoperative positions.

28. In an automatic device for control of machines, comprising a record tape and means actuated thereby for control of the device, a power shaft and means actuated thereby for operating the device in accordance with said control and including means for positive intermittent advancing of the record tape, said last named means including a cam mounted for periodic rotational and for periodic simultaneously rotational and axial movement, a stationary stud cooperating with said cam, a worm depending of the cam, a worm wheel meshing with the worm, the latter, during said rotational-axial movement of the cam, having a rack-like action on the worm wheel in the direction opposite to that of its rotation, at the rate of speed susbtantially equivalent to its rotational movement, causing it thereby to dwell, and a feed-wheel for the record tape secured to said worm wheel for intermittent feeding of the record tape.

29. An automatic movement control device for machines, comprising a record tape having a variety of control portions in its two edges, a power shaft, means actuated by the power shaft for intermittent driving of the record tape, two output shafts each carrying a combined motion-translating and torque-amplifying mechanism having means for mutual intermittent operative engagement including setting lugs arranged to be selectively set in inoperative, restraining position on both sides of its output shaft and thereby not engageable by the respective torque-amplifying mechanism, in inoperative, restraining position on one side thereof and in operative position on the opposite side and thereby engageable by the respective torque-amplifying mechanism; a movement-transfer mechanism having means adapted for constant operative contact with the control edges of the record tape and means for intermittent operative contact with the setting lugs of each of the motion-translating mechanisms for setting same in accordance with the particular control portion at the time in operative contact with the movement-transfer mechanism; and means actuated by the power shaft for operating said torque-amplifying mechanisms and the output shafts through the motion-translating mechanisms in consonance with the settings by the movement-transfer mechanism.

30. In an automatic control device for machines, two output shafts each carrying a torque-amplifying mechanism comprising an operating pin and adapted for oscillating movement, a motion-translating mechanism cooperating with the first named mechanism on each of said shafts and comprising a right-hand and a left-hand member forming a pair, each of said members being provided with a lug, two abutments and with a lobe, a spring attached with one end to each of said members of a pair whereby said lugs are urged toward each other, each of said members being adapted to be set selectively in operative and in inoperative position depending on the position of its lug, control means for setting said members in the said operative and inoperative positions, said operating pins being adapted for engagement with one of the two abutments of respective members when set in said operative positions, a pawl pivotally connected to each of said members, the pawls of right-hand members having their operating ends disposed in the opposite direction to those connected to left-hand members, a ratchet wheel individual to each pawl, disposed with their teeth in conformity with the operating ends thereof, being secured on each output shaft; an auxiliary meachanism comprising a plurality of levers, staggered relatively to each other, for alternate operative engagement with said pawls and with said lobes, and means for simultaneous operation of all levers of the said auxiliary mechanism.

31. In an automatic control device for machines, two output shafts independent of each other and each carrying a motion-translating mechanism, each of said mechanisms comprising a right-hand and a left-hand member forming a pair, each member provided with a setting lug by which it is set selectively in operative and in inoperative position, a spring having one end attached to each of said members of a pair whereby said lugs are urged toward each other, each of said members being provided with a pawl, the pawls on right-hand members having their operating ends disposed in a direction opposite to that of pawls on left-hand members, each pawl cooperating with a ratchet wheel individual to it, each ratchet wheel having teeth disposed in the direction corresponding to that of their pawls; an auxiliary mechanism including a cam and a plurality of levers operable by the cam cooperating with said pawls for alternate and simultaneous raising and releasing of pawls, relative their ratchets, connected to the right-hand members and to the left-hand members, respectively; and record-actuated mechanism including a series of stops for regulating said setting of motion-translating mechanisms by selective engagement with said setting lugs.

32. In a control device for machines, two output shafts each carrying a motion-translating mechanism and a torque-amplifying mechanism engageable with the motion-translating mechanism, said motion-translating mechanism including a pair of one right-hand and of one left-hand member, a spring connecting both members of a pair, each of said members being provided with a lobe and a pivoted pawl, a ratchet wheel for each of said pawls having teeth disposed in the opposite direction relative a second ratchet on each output shaft; an auxiliary mechanism comprising a plurality of relatively staggered levers effective for alternate lifting of pawls connected to the right-hand members above the teeth of respective ratchets while simultaneously releasing those connected to the left-hand members into engagement with teeth of respective ratchets, and similarly, for alternate engagement with lobes of right-hand members, against their springs, while simultaneously receding from lobes of left-hand members, whereby said pawls and said lobes are set alternately in inoperative and in operative position, respectively.

33. In an automatic control device for machines, two parallel output shafts for movement independently of each other and each carrying a motion-translating mechanism, each of said mechanisms comprising a right-hand and a left-hand member forming a pair, each member being provided with a setting lug by which it is set selectively in operative and in inoperative position, and with a lobe, a spring attached with one end to each member of a pair for urging said lugs in the direction of each other, a spring-pressed pivoted pawl on each of said members, the pawls of right-hand members of a pair having their operating ends disposed in the direction opposite to that of pawls of left-hand members, a ratchet wheel individual to each pawl, having teeth disposed in conformity with the operating ends thereof is secured on respective output shaft; an auxiliary mechanism, including a plurality of relatively staggered levers adapted for a limited oscillating movement, one lever for each pawl and each lobe, said levers co-acting with the pawls for raising the operating ends thereof above the teeth of respective ratchets of right-hand members, while simultaneously releasing those of left-hand members into engagement with their ratchets, and others of said levers co-acting with the lobes of right-hand and left-hand members for respective alternate engagement and disengagement therewith, against and with their springs, respectively, said raising and releasing of pawls and said co-action with lobes by said levers being effectuated alternately, a cam, means actuated by the cam for simultaneous operating of all of said staggered levers; a movable record tape, and a record-actuated mechanism, including a series of stops, for regulating said settings of motion-translating mechanisms by engagement with said setting lugs against their springs.

34. In an automatic control device, two output shafts for movement independent of each other each carrying two groups of mechanisms, each group comprising a motion-translating mechanism and a torque-amplifying mechanism mutually engageable, a base, a third shaft carrying a pitman, means on said output shafts, means on said third shaft and on the base for oscillating in unison said torque-amplifying mechanisms on both output shafts and in the opposite direction relative each other on the same shaft upon oscillation of the pitman, a power shaft, means connected to the power shaft for oscillating the pitman; each motion-translating mechanism comprising a right-hand and a left-hand member forming a pair, a spring attached with one end to each of said members of a pair, each of said members being provided with a lobe and with a pivoted pawl, a ratchet wheel for each of said pawls, the pawls of right-hand members engaging ratchet wheels having teeth in the opposite direction to those of left-hand members, and including an auxiliary mechanism comprising a plurality of relatively staggered levers having hubs and mounted on shafts paralleling the output shafts, means connected to the power shaft for operating the auxiliary mechanism in timed relation with oscillations of said torque-amplifying mechanisms, including a cam, a cam follower having a depending lever, a central pivotal mounting for the latter, a second lever similarly pivoted, a pair of relatively long bars having pivotal connections with the free ends of said two centrally pivoted levers adapted for simultaneous limited oscillating movement in opposite direction of each other, a plurality of links pivotally connected to said bars and to the hubs of said staggered levers, above and below their respective shaft mounting, whereby one-half of staggered levers will oscillate in unison in the opposite direction to the second half on the same shaft upon rotation of said cam, a staggered lever for each of said pawls and each of said lobes, for alternate lifting of pawls above teeth of ratchets associated with the right-hand members, while simultaneously releasing pawls associated with the left-hand members, and similarly, for alternate engagement with said lobes of right-hand members, against their springs, while simultaneously receding from lobes of left-hand members, whereby said pawls and said lobes being set alternately in inoperative and in operative position, respectively.

35. An automatic control device for machines, comprising a record tape having registry of movements in its edges, a record-actuated movement-transfer mechanism, including a series of staggered stops; two output shafts, two groups of mechanisms on each output shaft for independent movement of each other, each group comprising a motion-translating mechanism and a torque-amplifying mechanism provided with mutually engageable means, each motion-translating mechanism comprising a pair of members each provided with an operating abutment, a setting lug, a lobe and with a pivoted pawl cooperating with a ratchet wheel, one of which having teeth disposed in the direction opposite to that of the same mechanism, all ratchet wheels being secured on output shafts; said setting lugs being adapted for intermittent engagement with said stops by said springs, whereby said engageable means are regulated for operative and inoperative position between mechanisms of a group in consonance with the registry of movements on the record tape; each motion-translating mechanism also includes oscillating levers, forming part of an auxiliary mechanism, adapted for alternate engagement with one pawl and one lobe and for simultaneous disengagement from one pawl and one lobe of each motion-translating mechanism, shafts carrying said levers and connecting means between the levers for their simultaneous oscillation; each of said torque-amplifying mechanisms is provided with an operating pin mounted for oscillatory movement, and adapted for operative engagement with an abutment set in operative position in the path of its movement, by said stops, resulting in a corresponding rotary movement to the respective output shaft; a third shaft carrying a pitman, a base, means on the base, on the third shaft and on output shafts for simultaneous oscillation of torque-amplifying mechanisms on both output shafts, and for oscillation of torque-amplifying mechanisms on the same shaft in opposite direction to each other, upon oscillation of the pitman; a power shaft, means independent of each other actuated by the power shaft for advancing the record tape, for operating the auxiliary mechanism, and for oscillating the pitman, whereby the output shafts are rotated in accordance with the record tape, with power corresponding to that applied to the power shaft.

36. An automatic control device for machines, comprising two output shafts independent of each other, each carrying a motion-translating mechanism and a torque-amplifying mechanism mutually engageable, each motion-translating mechanism comprising a right-hand member and a left-hand member forming a pair, each member being provided with a setting lug, a lobe and with an operating abutment, a spring having one end attached to each of said members of a pair whereby said lugs are impelled in the direction of each other, a pivoted pawl on each of said members, a ratchet wheel cooperating with each of said pawls is secured on respective output shafts, one ratchet wheel having teeth disposed clockwise and the second ratchet counterclockwise on each output shaft; an auxiliary mechanism comprising a plurality of staggered levers disposed for oscillatory movement, for alternate engagement and disengagement with said pawls and lobes of right-hand members and left-hand members, respectively, shafts supporting said levers and means for simultaneous operation of all of said levers; each of said torque-amplifying mechanisms is provided with an operating pin having an oscillatory movement, and operatively engageable with an abutment of said members of a pair, in the direction said operating pin is moving at the time, such engagement of the operating pin, during oscillation thereof, with the right-hand abutment of the right-hand member producing a limited clockwise rotation of the output shaft on which it is mounted and similarly, engagement with the left-hand abutment of the left-hand member producing a limited counter-clockwise rotation of the same shaft; a record tape having movements recorded in its edges, a movement-transfer mechanism provided with means for constant resilient contact with both edges of the record tape and with means, including stops, for selective engagement with said setting lugs, whereby a right-hand abutment of the right-hand member and a left-hand abutment of the left-hand member may be positioned, by pressure of said springs, in the path of the oscillating operating pins for engagement therewith, and positioned for no engagement with said pins, as governed by the record tape; a power shaft, means actuated by the power shaft for advancing the record tape, other means actuated by the power shaft for operating the auxiliary mechanism, and still other means actuated by the power shaft for oscillating said torque-amplifying mechanisms, and when in engagement with the motion-translating mechanisms, for rotating the output shafts in accordance with movements recorded in the edges of the record tape, with power corresponding to that applied to the power shaft.

37. An automatic movement control device for machines, comprising control means, a power shaft, two output shafts, two groups of mechanisms on each output shaft, each group comprising a motion-translating unit secured on its output shaft and a torque-amplifying unit loosely mounted thereon, means on each motion-translating and power-amplifying unit for intermittent mutual operative engagement, said control means including means for positioning said units for operative engagement, means for simultaneous oscillation of the torque-amplifying units on both output shafts and for simultaneous oscillation in opposite directions of said torque-amplifying units on each output shaft, and means for effectuating said oscillations being connected to the power shaft.

38. An automatic movement control device for machines, comprising a power shaft, a record tape, a movement-transfer mechanism cooperating with the record tape, two output shafts carrying means controlled by said record tape through said movement-transfer mechanism, torque-amplifying means on the output shafts, engageable with the controlled means on the respective shafts, operable by means connected to the power shaft, for rotating the output shafts in consonance with said controlled means; means driven by the power shaft for moving the record tape and through the latter for controlling the controlled means on output shafts, whereby the relatively slight effort exerted by the record tape through the movement-transfer mechanism for control of movements of said controlled means is amplified in strength by the torque-amplifying means operable by said power shaft.

39. In an automatic control device for machines, two output shafts for movement independent of each other each carrying a group of mechanisms, each group comprising two motion-translating mechanisms and two torque-amplifying mechanisms, each motion-translating mechanism and each torque-amplifying mechanism of a group being provided with mutually engageable means, including elements adapted to be selectively positioned for causing their engagement, a third shaft carrying a pitman adapted for oscillating movement, connecting means between the torque-amplifying mechanisms and the third shaft whereby upon oscillation of the pitman all torque-amplifying mechanisms will oscillate in unison on both output shafts and in directions opposite one to the other on the same shaft, a power shaft, and means connecting the power shaft with the pitman, including an eccentric, for oscillating said pitman.

40. An automatic device for control of machines, comprising a record-controlled input mechanism and a power-operated output mechanism, said input mechanism including a movable record tape having movements recorded in its edges in the form of a series of steps of varying length paralleling the direction of movement of the tape, each control step having a definite position on the tape transversely thereof, the ends of adjacent control steps being joined by slopes; motion-translating means responsive to the movements recorded on the record tape and actuated thereby by intermediary means for selective settings in various operative positions and inoperative positions; said power-operated output mechanism including a power shaft and torque-amplfying means actuated thereby, and means on the motion-translating means and on the torque-amplifying means being mutually engageable when the motion-translating means are positioned by the record tape through the said intermediary means in one of the operative positions whereby the input control movements of the record tape on said motion-translating means are amplified in strength by the power shaft of the output mechanism.

41. In an automatic control device for machines, two output shafts each carrying mutually engageable motion-translating and torque-amplifying means, a third shaft carrying a pitman, a power shaft, means between the power shaft and the pitman, including twin eccentrics, for operating the pitman, geared means on the output shafts and on the third shaft carrying the pitman whereby said torque-amplifying means are oscillated in unison on both output shafts during rotation of the power shaft.

42. An automatic control device having mutually engageable record-controlled means and torque-amplifying means, two output shafts independent of each other controlled by the first means and operated by the second means when in engagement with the first means, a third shaft provided with a pitman, means on the third shaft connecting it with the said torque-amplifying means on both output shafts for simultaneous operation, a power shaft, means connecting the power shaft with said pitman, including twin eccentrics and their followers, said eccentrics of substantially equal eccentricity being secured on a shaft common to both with their eccentric portions disposed at an angle relative to each other, providing thereby an additional period of dwell to the normal dwell of a single eccentric during each reversal of movement, a link to which the free ends of the followers are connected, and means connecting the link with the pitman, whereby said torque-amplifying means are oscillated with a dwell between oscillations.

43. In a control device for machines, two output shafts each carrying a group of integrated mechanisms mutually engageable said shafts operating by the respective group of mechanisms independently one from the other in either direction, a power shaft, means between the power shaft and said mechanisms for operating both of said output shafts through said mechanisms, said means including a cam and its follower, effective for operating said mechanisms in unison.

44. In an automatic control device, two output shafts, each carrying two torque-amplifying mechanisms each comprising an operating pin and two motion-translating mechanisms engageable therewith for operating said shafts, a train of gears connecting said torque-amplifying mechanisms for simultaneous oscillation of the operating pins on both output shafts and in opposite direction one to the other on the same shaft, a power shaft, and means for operating said gears by the power shaft.

45. In an automatic control device for machines, a record tape, a power shaft, two output shafts, a motion-translating mechanism on each of said shafts controlled by the record tape and a torque-amplifying mechanism operated by the power shaft; means on each of the motion-translating mechanisms positionable by means governed by the record tape for intermittent selective mutual engagement with means on respective torque-amplifying mechanism, an auxiliary mechanism forming part of the said motion-translating mechanism, and means independent of each other connected to the power shaft including, means for operating in timed relation said torque-amplifying mechanism including an eccentric, means for operating said auxiliary mechanism including a cam, and means for driving the record tape including a cam and a worm combination.

References Cited in the file of this patent

UNITED STATES PATENTS

| | | |
|---|---|---|
| 1,849,462 | Schenker | Mar. 15, 1932 |
| 2,368,151 | McConnell | Jan. 30, 1945 |
| 2,423,440 | Neergaard | July 8, 1947 |
| 2,475,245 | Leaver et al. | July 5, 1949 |
| 2,484,968 | Sponaugle | Oct. 18, 1949 |
| 2,622,454 | Boehm | Dec. 23, 1952 |
| 2,628,539 | Neergaard | Feb. 17, 1953 |

FOREIGN PATENTS

| | | |
|---|---|---|
| 672,853 | Great Britain | May 28, 1952 |